(12) United States Patent
Skinner et al.

(10) Patent No.: US 11,150,455 B2
(45) Date of Patent: Oct. 19, 2021

(54) REDUCED DIMENSIONALITY STRUCTURED ILLUMINATION MICROSCOPY WITH PATTERNED ARRAYS OF NANOWELLS

(71) Applicants: Illumina, Inc., San Diego, CA (US); Illumina Cambridge Limited, Cambridge (GB)

(72) Inventors: Gary Mark Skinner, Kedington (GB); Geraint Wyn Evans, Cambridge (GB); Stanley S. Hong, Palo Alto, CA (US)

(73) Assignees: ILLUMINA, INC., San Diego, CA (US); ILLUMINA CAMBRIDGE LIMITED, Cambridge (GB)

( * ) Notice: Subject to any disclaimer, the term of this patent is extended or adjusted under 35 U.S.C. 154(b) by 0 days.

(21) Appl. No.: 16/621,122

(22) PCT Filed: Jan. 22, 2019

(86) PCT No.: PCT/US2019/014574
§ 371 (c)(1),
(2) Date: Dec. 10, 2019

(87) PCT Pub. No.: WO2019/147581
PCT Pub. Date: Aug. 1, 2019

(65) Prior Publication Data
US 2020/0103639 A1    Apr. 2, 2020

Related U.S. Application Data

(60) Provisional application No. 62/621,564, filed on Jan. 24, 2018.

(30) Foreign Application Priority Data

Mar. 20, 2018    (NL) .................................. N2020622

(51) Int. Cl.
*G02B 21/06* (2006.01)
*B01L 3/00* (2006.01)
(Continued)

(52) U.S. Cl.
CPC ............ *G02B 21/06* (2013.01); *B01L 3/5085* (2013.01); *G01N 21/05* (2013.01); *G02B 21/16* (2013.01);
(Continued)

(58) Field of Classification Search
CPC ...... G02B 21/367; G02B 21/06; G02B 21/16; G02B 27/58; G02B 21/0032;
(Continued)

(56) References Cited

U.S. PATENT DOCUMENTS 3,856,986 A    12/1974  Macovski
4,213,706 A     7/1980  Hill et al.
(Continued)

FOREIGN PATENT DOCUMENTS

CA    2 998 677 A1    3/2017
CN    1292227 C      12/2006
(Continued)

OTHER PUBLICATIONS

Frohn, J. , et al., "Three-dimensional resolution enhancement in fluorescence microscopy by harmonic excitation", Optics Letters 26 (11), 2001, 828-830.
(Continued)

*Primary Examiner* — Michael P Stafira
(74) *Attorney, Agent, or Firm* — Marshall, Gerstein & Borun LLP

(57) ABSTRACT

Techniques are described for reducing the number of angles needed in structured illumination imaging of biological samples through the use of patterned flowcells, where nanowells of the patterned flowcells are arranged in, e.g., a
(Continued)

square array, or an asymmetrical array. Accordingly, the number of images needed to resolve details of the biological samples is reduced. Techniques are also described for combining structured illumination imaging with line scanning using the patterned flowcells.

18 Claims, 14 Drawing Sheets

(51) Int. Cl.
| | |
|---|---|
| G01N 21/05 | (2006.01) |
| G02B 21/16 | (2006.01) |
| G02B 21/36 | (2006.01) |
| G02B 27/42 | (2006.01) |

(52) U.S. Cl.
CPC ......... *G02B 21/365* (2013.01); *G02B 27/425* (2013.01); *B01L 2300/0654* (2013.01); *B01L 2300/0663* (2013.01); *B01L 2300/0893* (2013.01); *B01L 2300/0896* (2013.01)

(58) Field of Classification Search
CPC .............. G02B 21/0076; G02B 21/361; G02B 21/0056; G02B 21/365; G02B 21/14; G02B 21/008; G02B 21/0072; G02B 27/425; G02B 21/002; G02B 21/006; G02B 21/0092; G02B 21/0024; G02B 21/0064; G02B 21/02; G02B 21/082; G02B 21/241; G02B 21/26; G02B 21/36; G02B 26/06; G02B 26/0808; G02B 27/0075; G02B 27/095; G02B 27/1066; G02B 5/008; G02B 5/1814; G02B 5/1828; G02B 5/3083; G02B 13/0095; G02B 13/22; G02B 21/0004; G02B 21/0044; G02B 21/0048; G02B 21/0068; G02B 21/0084; G02B 21/025; G02B 21/086; G02B 21/18; G02B 26/0816; G02B 26/0833; G02B 27/0068; G02B 27/00927; G02B 27/1086; G02B 27/283; G02B 27/60; G02B 5/005; G02B 1/00; G02B 1/002; G02B 2005/1804; G02B 21/0012; G02B 21/0016; G02B 21/0036; G02B 21/0052; G02B 21/04; G02B 21/08; G02B 21/084; G02B 21/12; G02B 21/125; G02B 21/24; G02B 21/245; G02B 21/33; G02B 21/34; G02B 21/364; G02B 21/368; G02B 2207/113; G02B 2207/114; G02B 23/2423; G02B 23/2484; G02B 26/02; G02B 26/0875; G02B 26/105; G02B 26/106; G02B 27/0025; G02B 27/01; G02B 27/09; G02B 27/0911; G02B 27/0955; G02B 27/0966; G02B 27/1013; G02B 27/106; G02B 27/1093; G02B 27/14; G02B 27/143; G02B 27/144; G02B 27/145; G02B 27/4272; G02B 27/46; G02B 5/00; G02B 5/0236; G02B 5/08; G02B 5/18; G02B 5/1847; G02B 5/1866; G02B 6/0035; G02B 6/06

See application file for complete search history.

(56) References Cited

U.S. PATENT DOCUMENTS

| | | |
|---|---|---|
| 5,761,085 A | 6/1998 | Giorgio |
| 6,188,478 B1 | 2/2001 | Fuchs et al. |
| 6,898,004 B2 | 5/2005 | Shimizu et al. |
| 6,947,127 B2 | 9/2005 | Wolleschensky et al. |
| 7,274,446 B2 | 9/2007 | Wolleschensky et al. |
| 7,532,323 B2 | 5/2009 | Tang et al. |
| 7,803,609 B2 | 9/2010 | Kaplan |
| 8,160,379 B2 | 4/2012 | Schaefer et al. |
| 8,222,040 B2 | 7/2012 | Hong et al. |
| 8,502,867 B2 | 8/2013 | Park |
| 8,509,879 B2 | 8/2013 | Durkin et al. |
| 8,759,077 B2 | 6/2014 | Hong et al. |
| 8,796,185 B2 | 8/2014 | Kim et al. |
| 8,817,362 B2 | 8/2014 | Lee |
| 8,848,199 B2 | 9/2014 | Choi et al. |
| 9,095,852 B2 * | 8/2015 | Lee ........... B01L 3/5085 |
| 9,194,811 B1 | 11/2015 | Zhao et al. |
| 9,426,400 B2 | 8/2016 | Brown et al. |
| 9,458,501 B2 | 10/2016 | Hong et al. |
| 9,465,228 B2 | 10/2016 | Lee et al. |
| 9,671,603 B2 * | 6/2017 | Kalkbrenner ...... G02B 21/0044 |
| 9,772,505 B2 | 9/2017 | Lee et al. |
| 9,831,362 B2 * | 11/2017 | Fan ................ H01L 31/02366 |
| 10,378,053 B2 | 8/2019 | Staker et al. |
| 10,429,665 B2 | 10/2019 | Lee et al. |
| 2002/0093641 A1 | 7/2002 | Ortyn et al. |
| 2003/0132373 A1 * | 7/2003 | Curtis ............... B01F 13/0052 |
| | | 250/251 |
| 2005/0239115 A1 | 10/2005 | Ryu et al. |
| 2008/0176290 A1 * | 7/2008 | Joseph ............... B01L 7/5255 |
| | | 435/91.2 |
| 2008/0316575 A1 * | 12/2008 | Curtis ................. G02B 21/32 |
| | | 359/279 |
| 2009/0168158 A1 * | 7/2009 | Schwertner ........... G02B 21/14 |
| | | 359/385 |
| 2009/0219607 A1 | 9/2009 | Saggau et al. |
| 2009/0225407 A1 | 9/2009 | Nakayama et al. |
| 2009/0238449 A1 | 9/2009 | Zhang et al. |
| 2009/0250632 A1 | 10/2009 | Kempe et al. |
| 2010/0038559 A1 | 2/2010 | Feke et al. |
| 2010/0140504 A1 | 6/2010 | Webb et al. |
| 2010/0260409 A1 | 10/2010 | Ben-Levy |
| 2011/0036996 A1 | 2/2011 | Wolleschensky et al. |
| 2011/0075151 A1 | 3/2011 | Jeong |
| 2011/0182529 A1 | 7/2011 | Kempe et al. |
| 2012/0026311 A1 * | 2/2012 | Ouchi ................. G02B 21/367 |
| | | 348/79 |
| 2012/0069344 A1 * | 3/2012 | Liu .................... G02B 5/008 |
| | | 356/450 |
| 2012/0156100 A1 | 6/2012 | Tsai et al. |
| 2013/0286181 A1 * | 10/2013 | Betzig ................. G02B 21/002 |
| | | 348/79 |
| 2013/0335819 A1 * | 12/2013 | Cooper ................ G02B 21/14 |
| | | 359/389 |
| 2014/0320957 A1 * | 10/2014 | Ouchi ............... G02B 21/0032 |
| | | 359/388 |
| 2015/0248015 A1 * | 9/2015 | Schwedt ........... G02B 21/0092 |
| | | 359/226.1 |
| 2015/0253559 A1 * | 9/2015 | Kalkbrenner .......... G02B 21/06 |
| | | 359/380 |
| 2015/0294076 A1 | 10/2015 | Treado et al. |
| 2016/0124208 A1 | 5/2016 | Best et al. |
| 2016/0273034 A1 | 9/2016 | Lundquist et al. |
| 2016/0334334 A1 | 11/2016 | Saxena et al. |
| 2016/0363728 A1 | 12/2016 | Wang et al. |
| 2017/0108444 A1 | 4/2017 | Otani et al. |
| 2017/0276610 A1 | 9/2017 | Fujita et al. |
| 2017/0370836 A1 | 12/2017 | Gerion et al. |
| 2019/0054461 A1 * | 2/2019 | Varadarajan .......... B01L 3/5085 |
| 2019/0056398 A1 * | 2/2019 | Wang-Johanning ... C07K 16/00 |

FOREIGN PATENT DOCUMENTS

| | | |
|---|---|---|
| JP | 2005080181 | 3/2005 |
| JP | 2008-537801 A | 9/2008 |
| JP | 2010-523973 A | 7/2010 |
| JP | 2011-523711 A | 8/2011 |
| JP | 2012-504252 A | 2/2012 |
| JP | 2015-529347 A | 10/2015 |
| KR | 20040001590 | 1/2004 |

(56) References Cited

FOREIGN PATENT DOCUMENTS

| KR | 101211532 B1 | * | 12/2012 |
| RU | 2502983 | | 12/2013 |
| WO | WO-2005/079544 A2 | | 9/2005 |
| WO | 2009/100830 | | 8/2009 |
| WO | WO-2015/022781 A1 | | 2/2015 |

OTHER PUBLICATIONS

Frohn, J., et al., "True optical resolution beyond the Rayleigh limit achieved by standing wave illumination", PNAS 97 (13), 2000, 7232-7236.

Krishnamurthi, V., et al., "Image processing in 3D standing-wave fluorescence microscopy", Three-Dimensional Microscopy: Image Acquisition and Processing III vol. 2655, International Society for Optics and Photonics, Apr. 10, 1996, 18-25.

\* cited by examiner

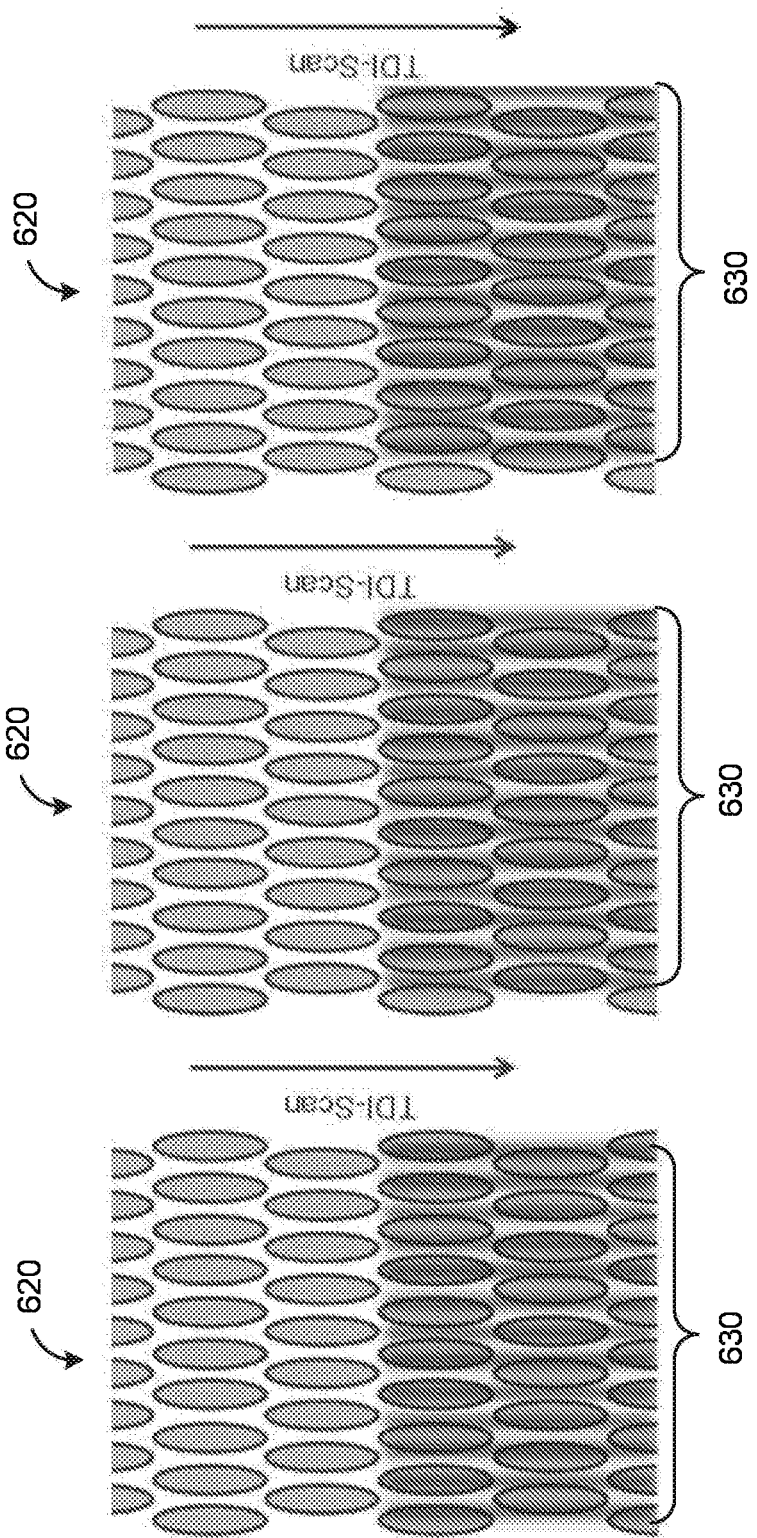

REDUCED DIMENSIONALITY STRUCTURED ILLUMINATION MICROSCOPY WITH PATTERNED ARRAYS OF NANOWELLS

CROSS-REFERENCE TO RELATED APPLICATIONS

This application is a 35 U.S.C. 371 National Stage of International Patent Application No. PCT/US2019/014574, filed Jan. 22, 2019, which itself claims the benefit of and priority to U.S. Provisional Patent Application No. 62/621,564, filed Jan. 24, 2018, and Dutch Patent Application No. N2020622, filed Mar. 20, 2018, the content of each of which is incorporated by reference herein in their entireties and for all purposes.

BACKGROUND

Numerous recent advances in the study of biology have benefited from improved methods for the analyzing and sequencing of nucleic acids. For example, the Human Genome Project has determined the entire sequence of the human genome which, it is hoped, will lead to further discoveries in fields ranging from treatment of disease to advances in basic science. A number of new DNA sequencing technologies have recently been reported that are based on the massively parallel analysis of unamplified, or amplified single molecules, either in the form of planar arrays or on beads.

The methodology used to analyze the sequence of the nucleic acids in such new sequencing techniques is often based on the detection of fluorescent nucleotides or oligonucleotides. Structured illumination microscopy (SIM) describes one such sequencing technique by which spatially structured (i.e., patterned) light may be used to image a sample in order to increase the lateral resolution of the microscope by a factor of two or more. During imaging of the sample, images of the sample may be acquired at various pattern phases (e.g., at 0°, 120°, and 240°), with the procedure being repeated by rotating the pattern orientation about the optical axis (e.g., by 60° and 120°). The captured images (e.g., nine images, one image for each orientation angle at each pattern phase) may be assembled into a single image having an extended spatial frequency bandwidth. The single image may be retransformed into real space to generate an image having a higher resolution than may normally be resolvable by the microscope.

In typical implementations of SIM systems, a linearly polarized light beam is directed through an optical diffraction grating that diffracts the beam into two or more separate orders that may be projected on the imaged sample as a sinusoidal interference fringe pattern. In these implementations, the orientation of the projected optical diffraction grating pattern is controlled by rotating the optical diffraction grating about the optical axis, while the phase of the pattern is adjusted by moving the optical diffraction grating laterally across the axis. In such systems, the optical diffraction grating is mounted on a translation stage, which in turn is mounted on a rotation stage. Additionally, such systems use a linear polarizer to polarize the light emitted by the light source before it is received at the grating.

FIG. 1A illustrates an example of a sample 100 and an optical diffraction grating pattern 102 projected onto sample 100. Although sample 100 may comprise unresolvable, higher spatial frequencies, overlaying optical diffraction grating pattern 102 that has a known, lower spatial frequency on sample 100 results in Moiré fringes. This effectively moves the unresolvable, higher spatial frequencies to lower spatial frequencies that are resolvable by a microscope. As described above, capturing images of sample 100 with different orientations/angles and phases of the optical diffraction grating pattern 102 relative to sample 100, results in images that can be combined into a single image that is retransformed into real space to generate an image having a higher resolution.

SUMMARY

Examples of systems and methods disclosed herein are directed to techniques for reducing the number of images and dimensions needed to resolve fluorescent samples using SIM through particularly patterned flowcells, and the leveraging of light beam movement relative to the fluorescent samples to achieve an implementation of SIM that can be used with line scanning techniques.

In accordance with one implementation, a method of imaging a biological sample, comprises projecting an optical pattern onto a biological sample and capturing a first image of the optical pattern overlaid on the biological sample. Additionally, the method may comprise phase shifting the projected optical pattern relative to the biological sample, and capturing at least a second image of the phase shifted optical pattern overlaid on the biological sample. Further still, the method may comprise reconstructing a high resolution image representative of the biological sample based upon the first captured image and the at least second captured image.

In some examples, the biological sample is contained in an asymmetrically patterned flowcell comprising a plurality of elongated nanowells. In some examples, each of the plurality of elongated nanowells are elliptically shaped or rectangularly shaped. In some examples, each of the plurality of elongated nanowells are oriented such that along a first axis of the asymmetrically patterned flowcell, resolution is increased to resolve information representative of the biological sample. In some examples, each of the plurality of elongated nanowells are oriented such that along a second axis of the asymmetrically patterned flowcell, resolution is not increased to resolve information representative of the biological sample.

In some implementations, the capturing of the first and the at least second images comprises performing line scanning imaging. The method may further include: directing light through an optical diffraction grating in a first phase and angle orientation, where the optical pattern projected onto the biological sample is an optical diffraction grating pattern generated by the light being directed through the optical diffraction grating, wherein phase shifting the projected optical pattern relative to the biological sample includes phase shifting the optical diffraction grating. The phase shifting of the optical diffraction grating may comprise phase shifting the optical diffraction grating along the first angle orientation. The phase shifting of the optical diffraction grating can occur perpendicularly to a direction of the line scanning imaging.

In some examples, the method may further comprise performing a third phase shift of the optical diffraction grating, projecting the optical diffraction grating pattern onto the biological sample and capturing at least a third image of the phase shifted optical diffraction grating pattern overlaid on the biological sample prior to reconstructing the high resolution image.

In some examples, a method of imaging a biological sample comprises directing light through an optical diffraction grating in a first phase and angle orientation, and projecting an optical diffraction grating pattern generated by the light being directed through the optical diffraction grating onto the biological sample and capturing a first image of the optical diffraction grating pattern overlaid on the biological sample. The method may further comprise phase shifting the optical diffraction grating, projecting the optical diffraction grating pattern onto the biological sample and capturing at least a second image of the phase shifted optical diffraction grating pattern overlaid on the biological sample. Additionally still, the method may comprise reorienting the optical diffraction grating to a second angle orientation, projecting the optical diffraction grating pattern onto the biological sample, and capturing a third image of the optical diffraction grating pattern overlaid on the biological sample. Moreover, the method may comprise phase shifting the optical diffraction grating, projecting the optical diffraction grating pattern onto the biological sample and capturing at least a fourth image of the phase shifted optical diffraction grating pattern overlaid on the biological sample. Furthermore, the method may comprise reconstructing a high resolution image representative of the biological sample based upon the first, the at least second, the third, and the at least fourth captured images.

In some examples, the biological sample is contained in a square array patterned flowcell comprising a plurality of nanowells.

In some examples, a system may comprise a laser source emitting a light beam, an optical diffraction grating adapted to generate an optical diffraction grating pattern upon passage of the emitted light beam through the optical diffraction grating, and a camera assembly. The camera assembly can be adapted to capture a plurality of images of optical diffracting grating pattern overlaid on a biological sample, the plurality of images reflecting three phases of the optical diffracting grating relative to the biological sample. The system may further include a processor adapted to reconstruct a high resolution image representative of the biological sample based a combination of the plurality of images.

In some examples, the biological sample is located in a flowcell comprising a plurality of nanowells oriented in an asymmetrical array. In some examples, each of the plurality of nanowells are elliptically shaped or rectangularly shaped. In some examples, each of the plurality of nanowells are oriented such that along a first axis of the flowcell, resolution is increased to resolve information representative of the biological sample. In some examples, each of the plurality of nanowells are oriented such that along a second axis of the flowcell, resolution is not increased to resolve information representative of the biological sample.

In some examples, the camera assembly comprises a time delay integration line scanning camera assembly. In some examples, the biological sample is contained in a flowcell, different portions of which are overlaid with representations of the three phases of the optical diffracting grating simultaneously.

In some examples, the optical diffraction grating of the system includes three phase stepped elements, where each of the three phase stepped elements is adapted to generate an optical diffraction grating pattern upon passage of the emitted light beam through the phase stepped element, where the camera assembly is adapted to capture an image of an optical diffracting grating pattern generated by each of the three phase stepped elements overlaid on the biological sample. In some examples, the camera assembly includes three image sensors, each of the three image sensors adapted to capture the image of the optical diffraction grating pattern generated by a respective one of the phase stepped elements.

In accordance with another implementation, a system may comprise: a laser source emitting a light beam; an optical diffraction grating adapted to generate an optical diffraction grating pattern upon passage of the emitted light beam through the optical diffraction grating; and a camera assembly adapted to capture a plurality of images of optical diffracting grating pattern overlaid on a biological sample, the plurality of images reflecting three phases of the optical diffracting grating relative to the biological sample and two angular orientations of the optical diffraction grating relative to the biological sample. The system may further comprise a processor adapted to reconstruct a high resolution image representative of the biological sample based a combination of the plurality of images.

In some examples, the biological sample is located in a flowcell comprising a plurality of nanowells oriented in a square array.

In some examples, each of the plurality of nanowells are oriented such that along resolution is increased to resolve information representative of the biological sample along first and second axes of the flowcell.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

BRIEF DESCRIPTION OF THE DRAWINGS

The present disclosure, in accordance with one or more various implementations, is described in detail with reference to the following figures. The figures are provided for purposes of illustration only and merely depict typical or example implementations.

FIGS. 6A-6C illustrate, in one example, phase shifting of a structured illumination pattern in one dimension.

Figure 1A:
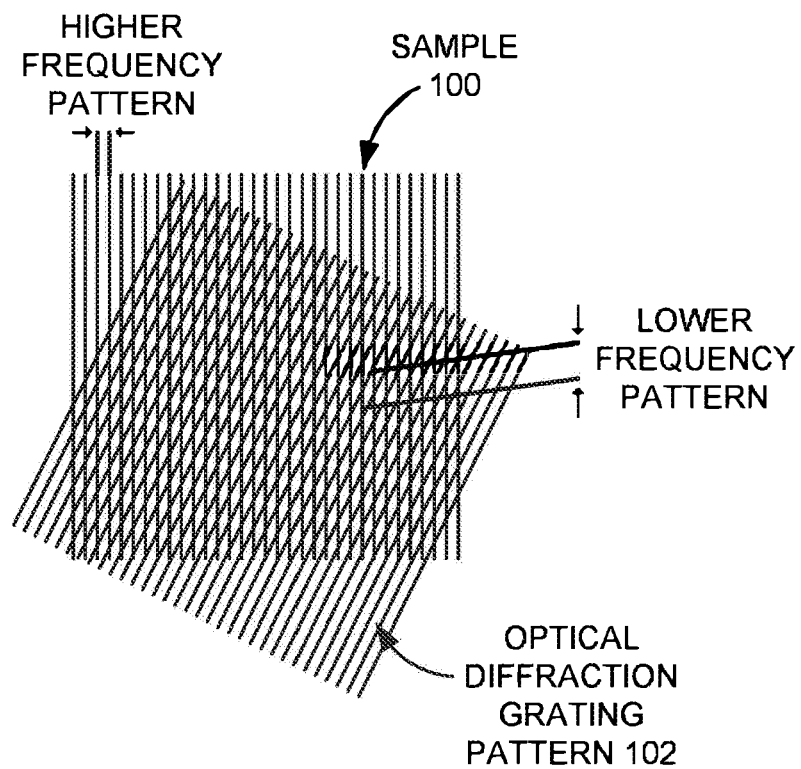
FIG. 1A illustrates one example of structured illumination being used to lower the frequency pattern of a sample allowing for increased resolution.

The figures are not exhaustive and do not limit the present disclosure to the precise form disclosed.

DETAILED DESCRIPTION

As used herein to refer to diffracted light emitted by a diffraction grating, the term "order" or "order number" is intended to mean the number of integer wavelengths that represents the path length difference of light from adjacent slits of the diffraction grating for constructive interference. The term "zeroth order" or "zeroth order maximum" is intended to refer to the central bright fringe emitted by a diffraction grating in which there is no diffraction. The term "first-order" is intended to refer to the two bright fringes emitted on either side of the zeroth order fringe, where the path length difference is ±1 wavelengths.

As used herein to refer to a sample, the term "spot" or "feature" is intended to mean a point or area in a pattern that can be distinguished from other points or areas according to relative location. An individual spot can include one or more molecules of a particular type. For example, a spot can include a single target nucleic acid molecule having a particular sequence or a spot can include several nucleic acid molecules having the same sequence (and/or complementary sequence, thereof).

As used herein, the term "tile" generally refers to one or more images of the same region of a sample, where each of the one or more images represents a respective color channel. A tile may form an imaging data subset of an imaging data set of one imaging cycle.

As used herein, the term "x-y plane" is intended to mean a 2 dimensional area defined by straight line axes x and y in a Cartesian coordinate system. When used in reference to a detector and an object observed by the detector, the area can be further specified as being orthogonal to the direction of observation between the detector and object being detected. When used herein to refer to a line scanner, the term "y direction" refers to the direction of scanning.

As used herein, the term "z coordinate" is intended to mean information that specifies the location of a point, line or area along an axis that is orthogonal to an x-y plane. In particular implementations, the z axis is orthogonal to an area of an object that is observed by a detector. For example, the direction of focus for an optical system may be specified along the z axis.

As used herein, the term "scan a line" is intended to mean detecting a 2-dimensional cross-section in an x-y plane of an object, the cross-section being rectangular or oblong, and causing relative movement between the cross-section and the object. For example, in the case of fluorescence imaging an area of an object having rectangular or oblong shape can be specifically excited (at the exclusion of other areas) and/or emission from the area can be specifically acquired (at the exclusion of other areas) at a given time point in the scan.

Implementations disclosed herein are directed to flowcells configured to have square or asymmetrical patterns. Recall that SIM relies on spatially structured (i.e., patterned) light to image a sample in order to increase the lateral resolution of the microscope by a factor of two or more. Also recall that traditionally, images of the sample at multiple pattern phases and multiple orientations/angles are used to achieve the desired increase in lateral resolution.

Figure 1B:
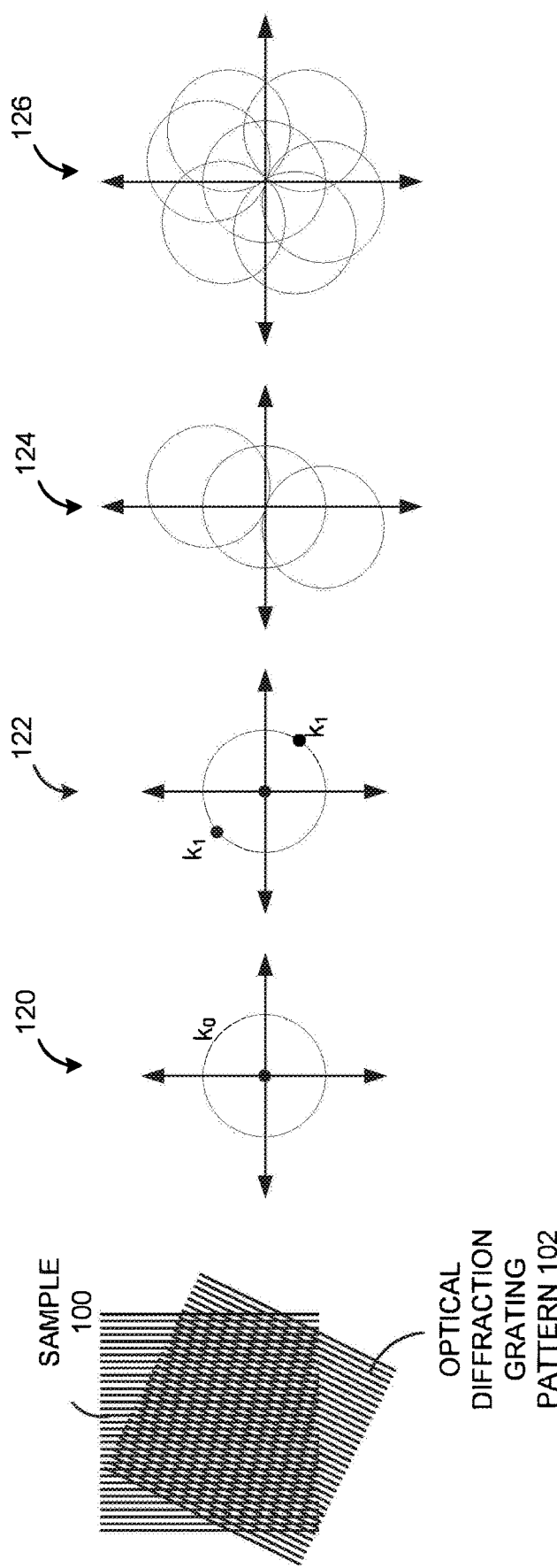
FIG. 1B illustrates, in one example, the number of angles needed to resolve a sample for imaging.

FIG. 1B illustrates generally, in one example, the observable region of reciprocal space produced by a microscope objective (which is analogous to its diffraction pattern) and how it is limited at the edges by the highest spatial frequencies that the objective can transmit ($2NA/\lambda$ (graph 120). As illustrated, a central spot represents the zeroth order component. The zeroth order and first order diffraction components representing a pattern of parallel lines are illustrated in graph 122. If the pattern spacings lie at the limits of resolution, the first order spots occur at the edge of the observable field (on the $k_0$ boundary). Due to frequency mixing, the observable regions also contain, in addition to the normal image of spatial frequencies (center circle), two new offset frequency images (graph 124) that are centered on the edge of the original field. These offset images contain higher spatial frequencies that are not observable using conventional microscopes. As illustrated by graph 126, a set of images prepared from three phases at 120° orientations, ultimately after processing, yield a real image that contains twice the spatial resolution as may be observed in widefield fluorescence microscopy.

However, by configuring flowcells to have square or asymmetrical patterns (rather than hexagonal patterns, for example), fewer images are needed, as the resolution enhancement required to resolve the substrate becomes anisotropic, hence constructing an anisotropic optical transfer function (OTF) through using a more restricted SIM angle set becomes sufficient to resolve the substrate to sufficient degree. That is, flowcells having square or asymmetrical patterns of nanowells allow the axis/axes of a flowcell having a tighter pitch (i.e., the distance between immediately adjacent nanowells) and involving increased resolution, to be aligned with the axis/axes whose resolution is to be increased. In one example of a square patterned flowcell, increased resolution is only needed with respect to two axes. Thus, only six images are needed (an image at each of two angles across three phases). In the case of an asymmetrically patterned flowcell, only three images of a sample are needed to achieve increased resolution (an image at one angle across three phases).

By reducing the number of angles needed to resolve a sample to the desired degree, the number of images needed to complete imaging of the sample is reduced. For example, in the context of 4-dye chemistry, a system may need to acquire 36 images in order to generate 4 images for basecalling (explained below). The amount of storage (e.g., disk)

space needed to store or cache the captured images can also be reduced. Additionally still, the processing and/or computational power needed to assemble the images into a single image, and then retransform/reconstruct that single image into one having the desired resolution can also be reduced.

Further still, conventional implementations of SIM are incompatible with sequencing systems that utilize line scanning techniques to image a sample. Line scanning can refer to using a line of pixels that image a flowcell line by line to build a continuous image (as opposed to a camera or sensor with a two-dimensional array of pixels that capture a still image of an entire object, e.g., a flowcell). One particular type of line scanning that lends itself to sequencing systems is time delay integration (TDI) line scanning.

With multi-angle SIM implementations, a fixed field of view is needed to acquire each of the angle/phase image combinations. However, when images are taken with respect to only a single angle, as is the case in implementations disclosed herein where an asymmetrically patterned flowcell is used as a sample substrate, TDI line scanning can be used to capture images of the sample covering the three SIM pattern phases. That is, a SIM pattern can be moved relative to the asymmetrically patterned flowcell to generate the three phases needed to resolve the sample in the flowcell with increased resolution along only one axis.

In some implementations, TDI line scanning can be used in conjunction with SIM techniques to image a sample by using a TDI line scanning camera or sensor to capture an image along a flowcell (referred to as a "swath"). That is, TDI line scanning can be performed on a flowcell patterned with a SIM pattern in a first phase. The SIM pattern can be shifted to a second phase, and TDI line scanning can be repeated. The SIM pattern can be shifted to a third phrase, and TDI line scanning can be repeated again. In this way, images of the sample at each pattern phase are captured.

Alternatively, different portions of the flowcell can be patterned with different phases of the SIM pattern. For example, at a first portion of the flowcell, the SIM pattern can be located in a first position, at a second portion of the flowcell, the SIM pattern can be shifted to a second position, and at a third portion of the flowcell, the SIM pattern can be shifted to a third position. Thus, as the camera or sensor captures the swath, images of the sample across each of the three SIM pattern phases are captured in a single TDI line scan.

Some implementations of TDI line scanning may be implemented with a three-chip TDI imager where the three phases of a projected fringe pattern may be specified in one scan. Such implementations may be implemented using a three-part diffraction grating, where each part of the diffraction grating corresponds to a specific phase. For example, a three-element diffraction grating, with each element phase-stepped, may be formed on the same substrate. By virtue of this implementation, no movement of the grating or sample may be needed apart from movement along the scanning direction.

In still other implementations, instead of shifting the SIM pattern relative to the sample/flowcell, the sample/flowcell is moved while the SIM pattern remains stationary. It is understood that the sample is located/placed in the flowcell resulting in the sample being patterned in accordance with the nanowells making up the flowcell. When implementing TDI line scanning, as noted above, the sample/flowcell is already moving. Hence, this movement of the sample/flowcell can be leveraged to avoid having to shift the SIM pattern. That is, the movement of the sample/flowcell relative to the stationary SIM pattern (given the appropriate orientation) generates the requisite phases needed to resolve the sample.

Figure 12:
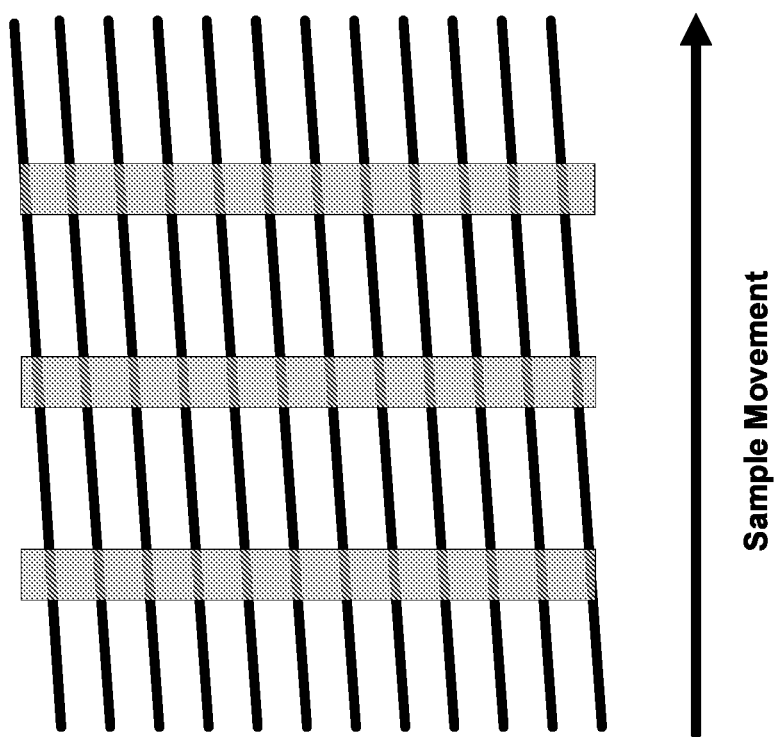
FIG. 12 illustrates an example implementation where a grating and well pattern are configured at a slight angular offset, with three thin illumination regions projected onto the sample, relatively far apart.

In some implementations, the grating and well pattern may be configured at a slight angular offset, with three thin illumination regions projected onto the sample, relatively far apart. Within each illumination line, wells may remain predominantly in phase with the grating, but the distance between the illumination regions may be sufficient that by the second illumination area they are lambda/3 out phase, for the phase shift. The spacing between the illumination lines in such implementations may make it easier to have 3 image sensors (e.g., three TDI scanner chips) next to each other. This example scenario is illustrated by FIG. 12.

Before describing various implementations of the systems and methods disclosed herein in detail, it is useful to describe an example environment with which the technology disclosed herein can be implemented. One such example environment is that of a structured illumination imaging system 200, illustrated in FIG. 2, that illuminates a sample with spatially structured light. For example, system 200 may be a structured illumination fluorescence microscopy system that utilizes spatially structured excitation light to image a biological sample.

Figure 2:
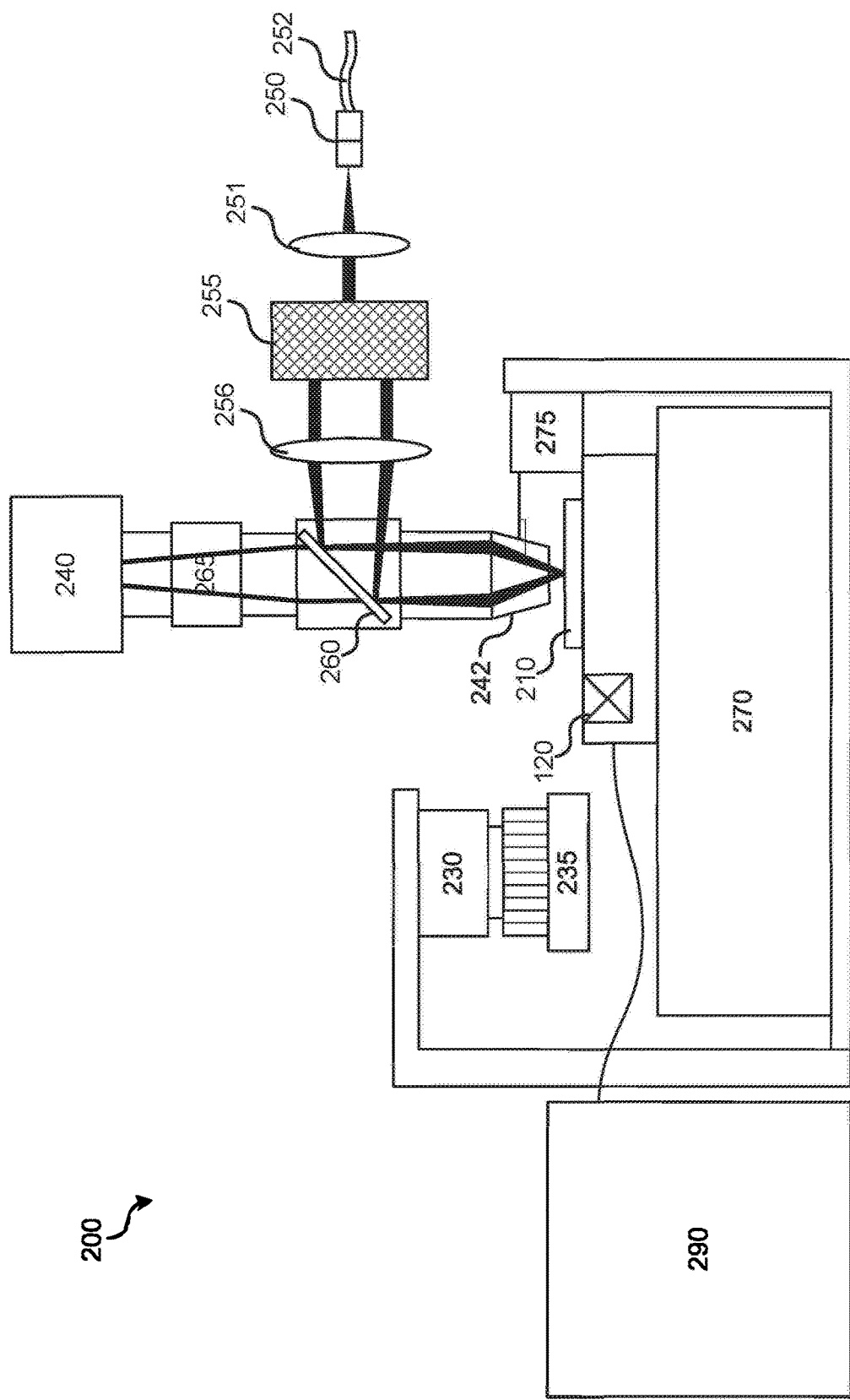
FIG. 2 illustrates one example of a structured illumination imaging system.

In the example of FIG. 2, a light emitter 250 is configured to output a light beam that is collimated by collimation lens 251. The collimated light is structured (patterned) by light structuring optical assembly 255 and directed by dichroic mirror 260 through objective lens 242 onto a sample of a sample container 210, which is positioned on a stage 270. In the case of a fluorescent sample, the sample fluoresces in response to the structured excitation light, and the resultant light is collected by objective lens 242 and directed to an image sensor of camera system 240 to detect fluorescence.

Light structuring optical assembly 255 in various implementations, further described below, includes one or more optical diffraction gratings to generate a sinusoidal pattern of diffracted light (e.g., fringes) that is projected onto samples of a sample container 210. The diffraction gratings may be one-dimensional or two-dimensional transmissive, reflective, or phase gratings. As further described below with reference to particular implementations, in system 200 the diffraction gratings do not necessarily involve a rotation stage. In some implementations, the diffraction gratings may be fixed (e.g., not rotated or moved linearly) during operation of the imaging system. For example, in a particular implementation, further described below, the diffraction gratings may include two fixed one-dimensional transmissive diffraction gratings oriented substantially or exactly/perfectly perpendicular to each other (e.g., a horizontal diffraction grating and vertical diffraction grating).

During each imaging cycle, system 200 utilizes light structuring optical assembly 255 to acquire a plurality of images at various phases, displaced laterally along the sample plane (e.g., along x-y plane), with this procedure repeated one or more times by rotating the pattern orientation about the optical axis (i.e., with respect to the x-y plane of the sample). The captured images may then be spatially reconstructed to generate a higher resolution image (e.g., an image having about twice the lateral spatial resolution of individual images).

In system 200, light emitter 250 may be an incoherent light emitter (e.g., emitting light beams output by one or more excitation diodes), or a coherent light emitter such as emitter of light output by one or more lasers or laser diodes. As illustrated in the example of system 200, light emitter 250 includes an optical fiber 252 for guiding an optical beam to be output. However, other configurations of a light emitter 250 may be used. In implementations utilizing structured illumination in a multi-channel imaging system (e.g., a multi-channel fluorescence microscope utilizing multiple wavelengths of light), optical fiber 252 may optically couple to a plurality of different light sources (not shown), each light source emitting light of a different wavelength. Although system 200 is illustrated as having a single light emitter 250, in some implementations multiple light emitters 250 may be included. For example, multiple light emitters may be included in the case of a structured illumination imaging system that utilizes multiple arms, further discussed below. For example, light corresponding to different wavelengths, such as blue, green, red, or other colors may be emitted. In some examples, one light emitter/source may be used. In some examples, two or more light emitters/sources may be used.

In some implementations, system 200 may include a tube lens 256 that may include a lens element to articulate along the z-axis to adjust the structured beam shape and path. For example, a component of the tube lens may be articulated to account for a range of sample thicknesses (e.g., different cover glass thickness) of the sample in container 210.

In the example of system 200, fluid delivery module or device 290 may direct the flow of reagents (e.g., fluorescently labeled nucleotides, buffers, enzymes, cleavage reagents, etc.) to (and through) sample container 210 and waste valve 220. Sample container 210 can include one or more substrates upon which the samples are provided. For example, in the case of a system to analyze a large number of different nucleic acid sequences, sample container 210 can include one or more substrates on which nucleic acids to be sequenced are bound, attached or associated. The substrate can include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the sample container 210. System 200 also may include a temperature station actuator 230 and heater/cooler 235 that can optionally regulate the temperature of conditions of the fluids within the sample container 210.

In particular implementations, the sample container 210 may be implemented as a patterned flowcell including a translucent cover plate, a substrate, and a liquid contained there between, and a biological sample may be located at an inside surface of the translucent cover plate or an inside surface of the substrate. The flowcell may include a large number (e.g., thousands, millions, or billions, or more) of wells or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flowcell may be further divided into a number of spaced apart lanes (e.g., eight lanes), each lane including a hexagonal array of clusters.

Sample container 210 can be mounted on a sample stage 270 to provide movement and alignment of the sample container 210 relative to the objective lens 242. The sample stage can have one or more actuators to allow it to move in any of three dimensions. For example, in terms of the Cartesian coordinate system, actuators can be provided to allow the stage to move in the X, Y and Z directions relative to the objective lens. This can allow one or more sample locations on sample container 210 to be positioned in optical alignment with objective lens 242. Movement of sample stage 270 relative to objective lens 242 can be achieved by moving the sample stage itself, the objective lens, some other component of the imaging system, or any combination of the foregoing. Further implementations may also include moving the entire imaging system over a stationary sample. Alternatively, sample container 210 may be fixed during imaging.

In some implementations, a focus (z-axis) component 275 may be included to control positioning of the optical components relative to the sample container 210 in the focus direction (typically referred to as the z axis, or z direction). Focus component 275 can include one or more actuators physically coupled to the optical stage or the sample stage, or both, to move sample container 210 on sample stage 270 relative to the optical components (e.g., the objective lens 242) to provide proper focusing for the imaging operation. For example, the actuator may be physically coupled to the respective stage such as, for example, by mechanical, magnetic, fluidic or other attachment or contact directly or indirectly to or with the stage. The one or more actuators can be configured to move the stage in the z-direction while maintaining the sample stage in the same plane (e.g., maintaining a level or horizontal attitude, substantially or perfectly perpendicular to the optical axis). It can be appreciated that perfect perpendicularity, parallelism, or other orientation may not be achievable in accordance with some examples or implementations due to, e.g., manufacturing tolerances, operational limitations, etc. However, for the purposes of the technologies disclosed herein, substantially perpendicular, parallel or other orientation is understood to mean an orientation sufficient to achieve a desired resolution or other relevant effect as described and/or contemplated herein. The one or more actuators can also be configured to tilt the stage. This can be done, for example, so that sample container 210 can be leveled dynamically to account for any slope in its surfaces.

The structured light emanating from a test sample at a sample location being imaged can be directed through dichroic mirror 260 to one or more detectors of camera system 240. In some implementations, a filter switching assembly 265 with one or more emission filters may be included, where the one or more emission filters can be used to pass through particular emission wavelengths and block (or reflect) other wavelengths. For example, the one or more emission filters may be used to switch between different channels of the imaging system. In a particular implementation, the emission filters may be implemented as dichroic mirrors that direct emission light of different wavelengths to different image sensors of camera system 240.

Camera system 240 can include one or more image sensors to monitor and track the imaging (e.g., sequencing) of sample container 210. Camera system 240 can be implemented, for example, as a charge-coupled device (CCD) image sensor camera, but other image sensor technologies (e.g., active pixel sensor) can be used. Output data (e.g., images) from camera system 240 may be communicated to a real time analysis module (not shown) that may be implemented as a software application that, as further described below, may reconstruct the images captured during each imaging cycle to create an image having a higher spatial resolution. As will be described below, camera system 240 may also be implemented as a TDI CCD camera to effectuate line scanning techniques.

Although not illustrated, a controller can be provided to control the operation of structured illumination imaging system 200, including synchronizing the various optical components of system 200. The controller can be implemented to control aspects of system operation such as, for example, configuration of light structuring optical assembly 255 (e.g., selection and/or linear translation of diffraction gratings), movement of tube lens 256, focusing, stage movement, and imaging operations. In various implementations, the controller can be implemented using hardware, algorithms (e.g., machine executable instructions), or a combination of the foregoing. For example, in some implementations the controller can include one or more CPUs or processors with associated memory. As another example, the controller can comprise hardware or other circuitry to control the operation, such as a computer processor and a non-transitory computer readable medium with machine-readable instructions stored thereon. For example, this circuitry can include one or more of the following: field programmable gate array (FPGA), application specific integrated circuit (ASIC), programmable logic device (PLD), complex programmable logic device (CPLD), a programmable logic array (PLA), programmable array logic (PAL) or other similar processing device or circuitry. As yet another example, the controller can comprise a combination of this circuitry with one or more processors.

Figure 3:
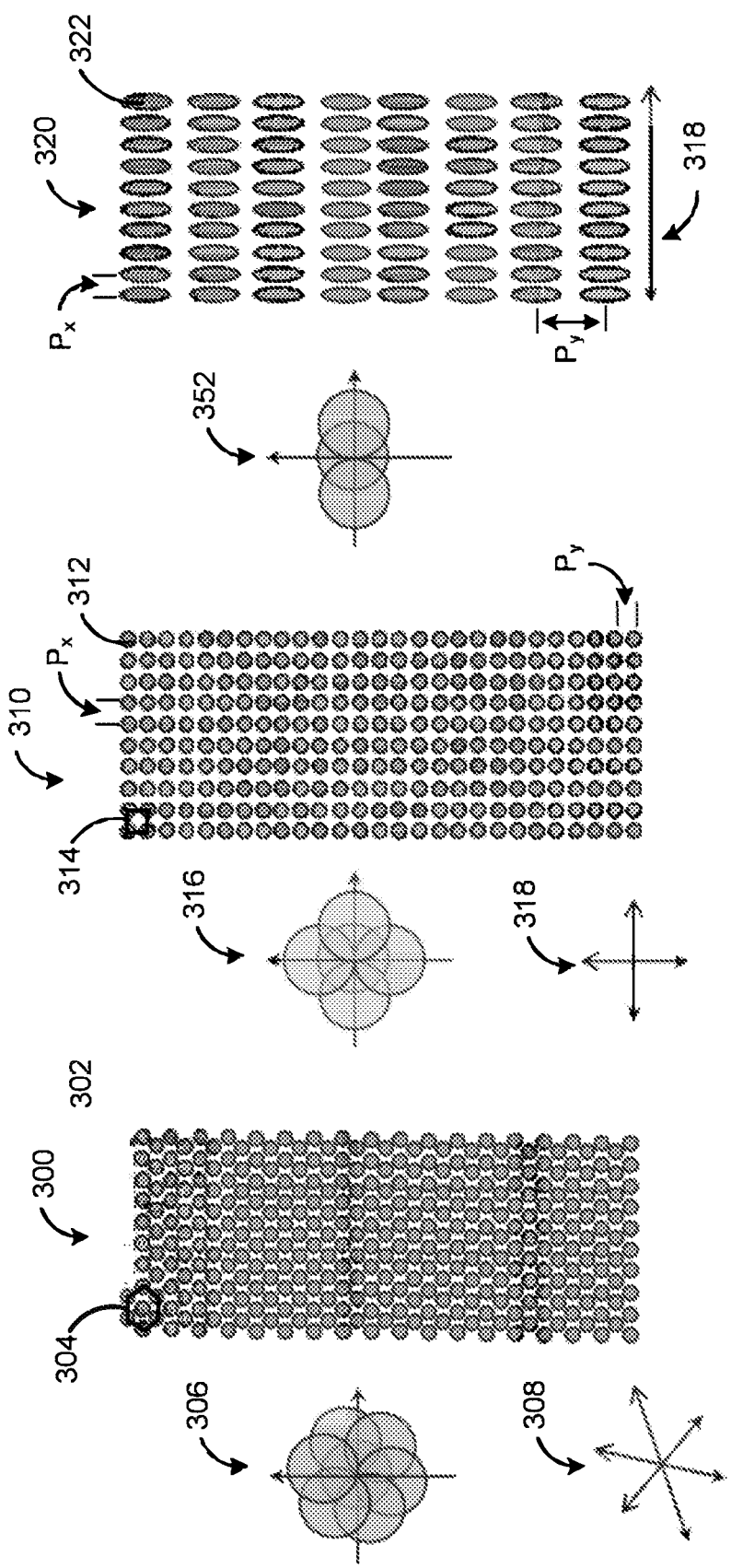
FIG. 3A illustrates an example of a hexagonal flowcell pattern.
FIG. 3B illustrates an example of a square array flowcell pattern, the use of which results in reduced dimensionality structured illumination imaging.
FIG. 3C illustrates an example of an asymmetrical array flowcell pattern, the use of which results in reduced dimensionality structured illumination imaging.

FIG. 3A illustrates an example configuration of a patterned flowcell 300 that may be imaged in accordance with implementations disclosed herein. In this example, flowcell 300 is patterned with a hexagonal array (see 304) of ordered spots or features 302 that may be simultaneously imaged during an imaging run. For ease of illustration, flowcell 300 is illustrated as having tens to hundreds of spots 302. However, as can be appreciated by one having skill in the art, flowcell 300 may have thousands, millions, or billions of spots 302 that are imaged. Moreover, in some instances, flowcell 300 may be a multi-plane sample comprising multiple planes (substantially or perfectly perpendicular to focusing direction) of spots 302 that are sampled during an imaging run. In a particular implementation, flowcell 300 may be patterned with millions or billions of wells that are divided into lanes. In this particular implementation, each well of the flowcell may contain biological material that is sequenced using sequencing by synthesis.

As alluded to above, in some examples in order to resolve a sample using patterned flowcell 300, at least nine images are needed to achieve the requisite resolution. This is because the hexagonal array of nanowells in patterned flowcell 300 is a high frequency pattern, where the pitch between nanowells is tight, and unresolvable. In particular, in this example there are two factors that can determine how many images are needed to sufficiently resolve a sample.

The first factor is the number copies of the optical passband that are desired. Referring back to FIG. 1B, graph 122 shows the normal passband without the use of SIM. Graph 124 illustrates an example in which one copy of the optical passband is created. This can improve resolution in one dimension, while graph 126/graph 306 (FIG. 3A) illustrates an example where three copies of the optical passband are created, which results in a fairly uniform resolution improvement in two dimensions.

The second factor is the number of images used to demodulate phases for each optical passband. Although theoretically, only two images are needed (to obtain the real and imaginary parts), three images are typically used to obtain better noise averaging.

It should be understood that when translating an image from spatial frequency to Fourier space (analysis of raw data generated by a microscope at the objective rear focal plane is based on Fourier analysis), the Fourier transform contains 3 components or axes. That is, the diffraction of light at the objective rear focal plane creates a diffraction barrier that dictates a maximum resolution of approximately 200 nm in the lateral (x,y) dimension and 500 nm in the axial (z) dimension, depending upon the objective numerical aperture and the average wavelength of illumination. Accordingly, when using the hexagonal array of nanowells in patterned flowcell 300 images are taken at three angles using SIM. As also discussed above, in order to obtain the requisite resolution, images must be taken across three phases at each of the three angles, where the three phases are needed to ensure all parts on imaging area are observed (i.e., to cover an entire wavelength of the SIM pattern), thereby resulting in nine images. This results in increased resolution in all three axes 308.

However, in one example, using another type of patterned flowcell, e.g., a flowcell 310, where nanowells 312 are patterned onto a square array (see 314), only two angles are needed to achieve increased resolution, the increased resolution being aligned along the axes of the square array. Graph 316 illustrates an example of this, where only two copies of the optical passband are created and needed to achieve the required resolution increase. In other words, a square patterned flowcell, such as flowcell 310 can be resolved by aligning the SIM pattern or fringe to those directions in which an increase in resolution is desired, in this case, along the two axes (x and y) of the square array. It can be appreciated that along any diagonal path between neighboring nanowells 312, there will be some resolution enhancement so that diagonally neighboring nanowells will be resolvable from one another. However, between nanowells 312 along the x and y axes, the pitch ($P_x$, $P_y$) is narrow enough that resolution needs to be boosted using SIM, i.e., the spatial frequency in the x and y axes is too high to be resolved.

By using a square patterned flowcell, such as flowcell 310, the dimensionality requirement of conventional sequencing systems using SIM can be reduced by one dimension, where resolution is increased in only two axes 318. That is, rather than capture nine images that cover three angles over three phases each, only six images that cover two angles over three phases each need to be captured in order to adequately resolve a sample contained within flowcell 310. This is advantageous despite a reduction in packing density of flowcell 310. For example, reduction in packing density may be only 11% over a hexagonal array having the same pitch. However, implementing SIM in accordance with various examples can result in a packing density increase of, e.g., 356% for a square patterned array with a 350 nm pitch, over a non-SIM hexagonal array with a 700 nm pitch.

By using still another type of patterned flowcell, in this example an asymmetrically patterned flowcell, the dimensionality requirement of conventional sequencing systems using SIM can be reduced by yet one more dimension. FIG. 3C illustrates a patterned flowcell 320 whose nanowells are patterned asymmetrically. In this implementation, each nanowell 322 is shaped or configured to form an elongated structure. As utilized herein, the term elongated structure refers to a shape where the dimension along a first axis is greater that the dimensions along a second axis. In this example, the x axis, is narrower than the length or height of nanowell 322 along another axis (in this example, the y axis). It should be understood that although the implementation illustrated in FIG. 3C uses elliptical nanowells, other types of elongated nanowells, e.g., rectangles, may be used.

Any shape of nanowell may be used that results in a pattern whereby the sample along only one axis is associated with a resolution increase using SIM. In some implementations, the dimension of the patterned features that the fringe width w is at least substantially the same as or slightly greater than may be a diameter of a circular feature, a length of a side of a square feature, a length of the longer side or shorter side of a rectangular feature, a diameter of an elliptical feature along its major axis or minor axis, or the longest dimension of an irregularly shaped feature along one axis of the feature (e.g., x or y axis). In some implementations, the nanowells may alternatively be shaped as squares or circles, but with asymmetric spacing therebetween. In various implementations, an asymmetrically patterned flow cell may refer to an array in which the primary frequency components are at different distances from the zero frequency component, an array whose unit cell may be defined by a variety of pitches, or an array in which the frequency components of the array may be resolved by an optical transfer function which is more asymmetric that the traditional 3-angle SIM OTF.

In this way, the sample can be resolved along one direction or axis, i.e., the y axis, while along another direction or axis, i.e., the x axis, SIM is used to increase resolution in order to resolve the sample. That is, along the x axis, the pitch, $P_x$, of asymmetrically patterned flowcell 320 is narrow or tight, entailing an increase in resolution, while along the y axis, the pitch, $P_y$, of asymmetrically patterned flow 320 is larger. Accordingly, resolution is increased in only one direction/along one axis 318, and only three images are captured in order to adequately resolve a sample contained within the nanowells of flowcell 320. Thus, as illustrated by graph 352, only one copy of the optical passband is created and needed to increase resolution.

Figure 4:
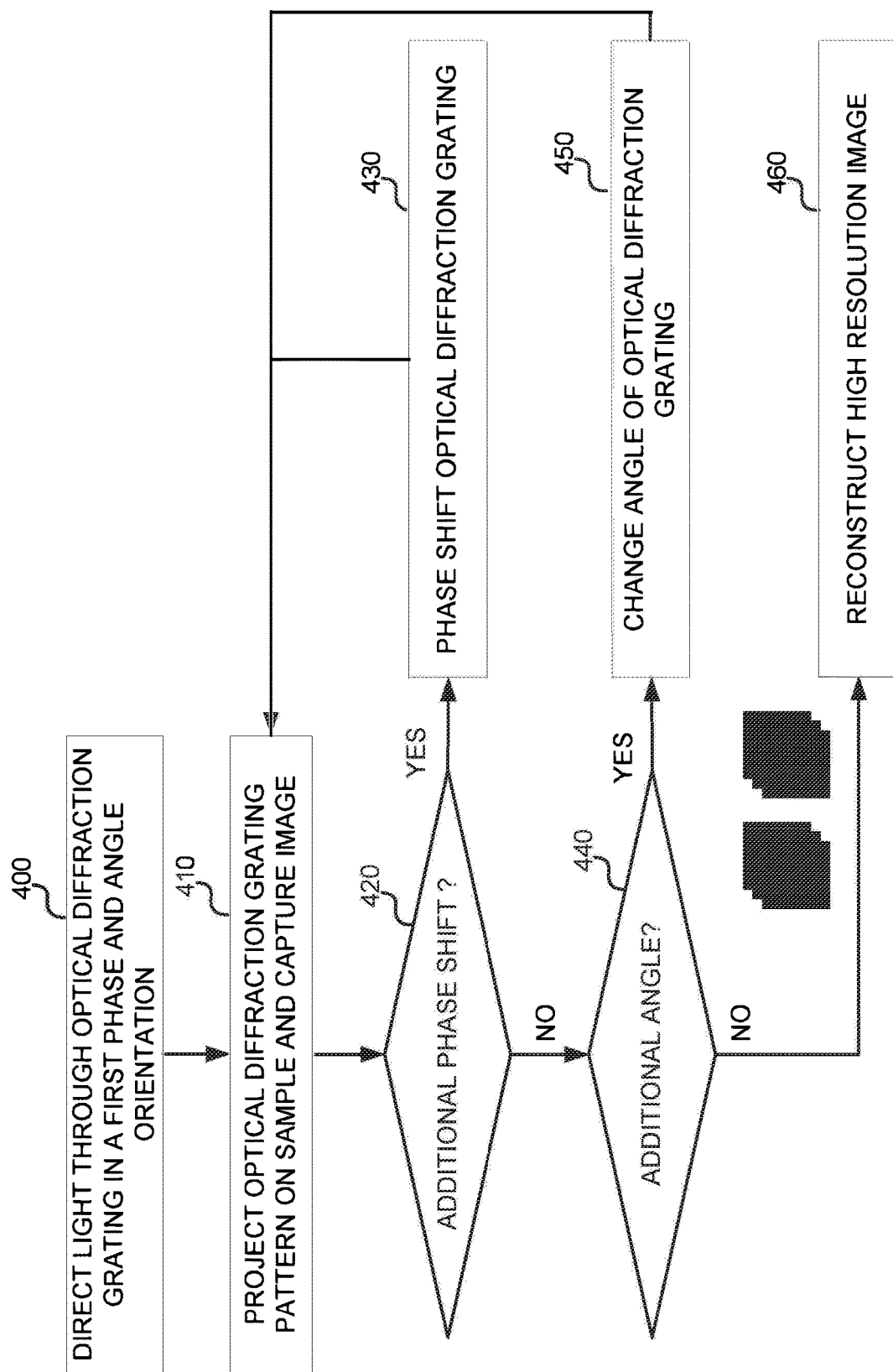
FIG. 4 is a flow diagram illustrating example operations that may be implemented for reduced dimensionality structured illumination imaging.

FIG. 4 is a flow chart illustrating example operations that can be performed in a sequencing system, such as structured illumination imaging system 200 of FIG. 2, to sequence a sample using a square or asymmetrically patterned flowcell. At operation 400, a light source corresponding to a first optical diffraction grating pattern oriented in a first phase may be turned on. At operation 410, the optical diffraction grating pattern in a first orientation is projected onto a sample and an image is captured. That is, referring back to FIG. 2, light emitter 250 can output a light beam that is collimated by collimation lens 251. The collimated light is structured (patterned) by light structuring optical assembly 255 and directed by dichroic mirror 260 through objective lens 242 onto a sample of sample container 210, which is positioned on a stage 270. In this implementation, sample container 210 comprises a patterned flowcell having a square or asymmetrical pattern, such as flowcells 310 or 320, respectively (FIGS. 3B and 3C). In the case of a fluorescent sample, the sample contained in the square or asymmetrically patterned flowcell fluoresces in response to the structured excitation light, and the resultant light is collected by objective lens 242 and directed to an image sensor of camera system 240 to detect fluorescence.

At operation 420, a check can be performed to determine if an additional phase shift is needed. If so, at operation 430, the optical diffraction grating is phase shifted, and operation returns to operation 410, where the optical diffraction grating pattern (phase shifted) is projected onto the sample, and an image is captured. As described previously, three phase shifts are generally performed to capture an entire imaging area, in this implementation, the entire area of the square patterned flowcell.

If no additional phase shift is needed, at operation 440, a check can be performed to determine if an additional angle is needed, and the angle of the optical diffraction grating is changed at operation 450. Operation returns to operation 410, where the optical diffraction grating pattern (after changing angles) is projected onto the sample, and an image is captured. Operation proceeds to operation 420, where if an additional phase shift is needed at 420, the optical diffraction grating is phase shifted at operation 430. Again, operation returns to operation 410, where the optical diffraction grating pattern (at a new angle and new phase) is projected onto the sample, and an image is captured. Again, in this implementation, images over three phases are needed to capture the entire are of the square patterned flowcell. It should be understood that the aforementioned controller used to control aspects of system operation of structured illumination imaging system 200 can be configured with instructions to perform the above-described functions, e.g., checking whether or not additional phase shifts or orientations of the optical diffraction grating pattern are needed to image the particular type of flowcell being used.

In the case of a square patterned flowcell, e.g., flowcell 310 (FIG. 3), images at two angles are needed to increase resolution along the two axes of flowcell 310. Accordingly, after capturing images with the optical diffraction grating pattern projected in two orientations corresponding to the two angles (over three phase shifts of the optical diffraction grating pattern), a high resolution image is reconstructed at operation 460 (by combining the six total images and retransforming them into real space. This high resolution image reconstruction can be done in-system, or in some examples, reconstruction can be performed using a separate processing entity.

In an implementation where the patterned flowcell is an asymmetrical flowcell, the above-described method need not involve changing angles. Again, with an asymmetrical flowcell, SIM is used to increase resolution along only one axis. Accordingly, the optical diffraction grating need only be phase shifted three times, allowing images to be captured for the three phase shifts. Accordingly, once no other phase shifts are needed at operation 420, the method proceeds to operation 460, where a high resolution image can be reconstructed using only the three captured images.

Figure 5:
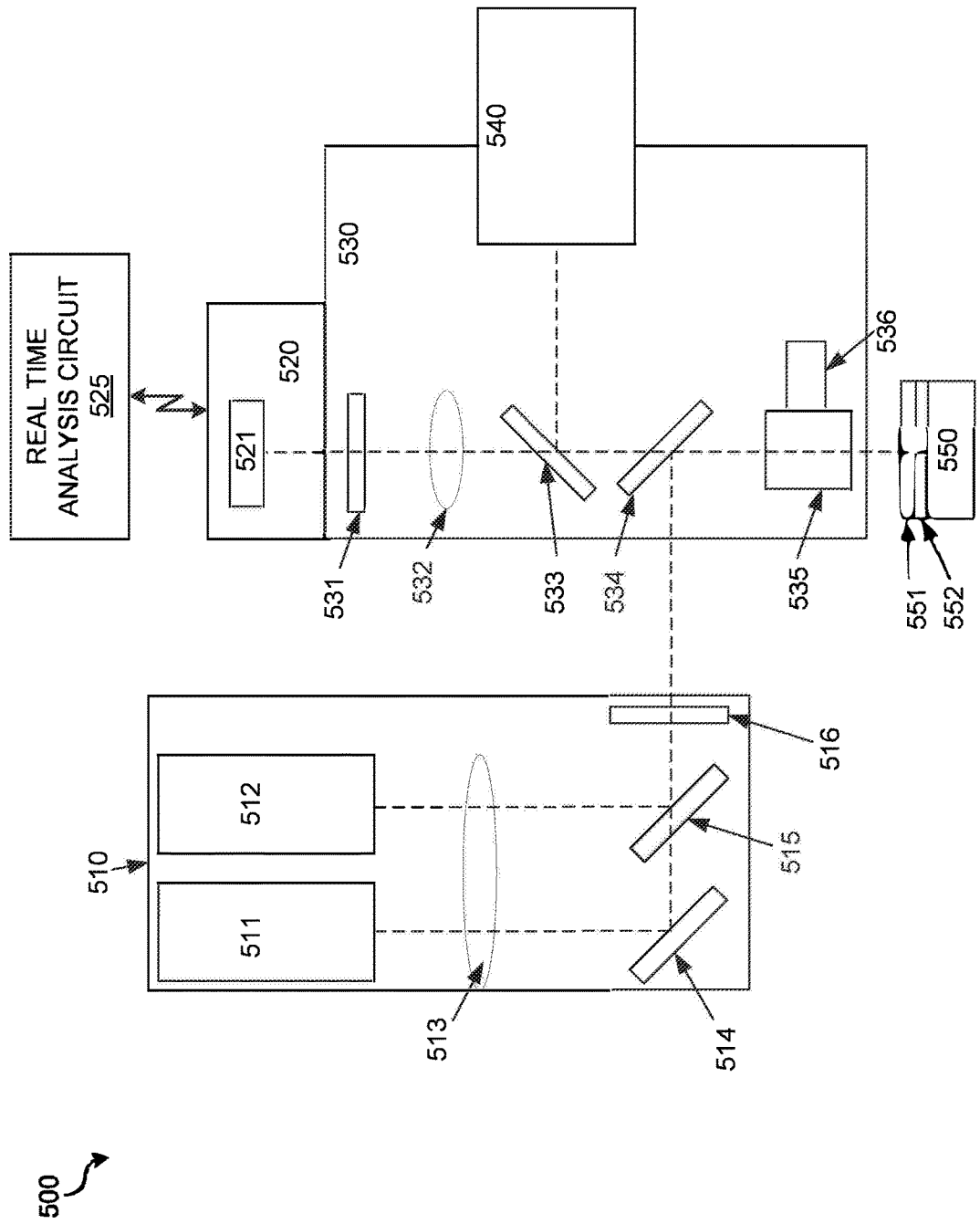
FIG. 5 illustrates one example of a line scanning imaging system.

As previously indicated, when using particularly patterned flowcells that can take advantage of reduced dimensionality SIM implementations, line scanning techniques, such as TDI line scanning, can be used to image samples contained in those patterned flowcells. FIG. 5 is block diagram illustrating an example two-channel, line scanning imaging system 500 that may be used to image a sample in various implementations.

As in the case of structured illumination imaging system 200 of FIG. 2, line scanning imaging system 500 may be used for the sequencing of nucleic acids, where those where nucleic acids are attached at fixed locations in an array (i.e., the wells of a flowcell, such as flowcell 320) and the array can be imaged repeatedly. In such implementations, line scanning imaging system 500 may obtain images in two different color channels, which may be used to distinguish a particular nucleotide base type from another. More particularly, line scanning imaging system 500 may implement a process referred to as "base calling," which generally refers to a process of a determining a base call (e.g., adenine (A), cytosine (C), guanine (G), or thymine (T)) for a given spot location of an image at an imaging cycle. During two-channel base calling, image data extracted from one of two images may be used to determine the presence of one of four base types by encoding base identity as a combination of the intensities of the two images. For a given spot or location in each of the two images, base identity may be determined based on whether the combination of signal identities is [on, on], [on, off], [off, on], or [off, off].

Referring again to line scanning imaging system 500, the system includes a line generation module LGC 510 with two light sources, 511 and 512, disposed therein. Light sources 511 and 512 may be coherent light sources such as laser diodes which output laser beams. Light source 511 may emit light in a first wavelength (e.g., a red color wavelength), and light source 512 may emit light in a second wavelength (e.g., a green color wavelength). The light beams output from laser sources 511 and 512 may be directed through a beam shaping lens or lenses 513. In some implementations, a single light shaping lens may be used to shape the light beams output from both light sources. In other implementations, a separate beam shaping lens may be used for each light beam. In some examples, the beam shaping lens is a Powell lens, such that the light beams are shaped into line patterns. The beam shaping lenses of LGC 510 or other optical components imaging system be configured to shape the light emitted by light sources 511 and 512 into a line patterns (e.g., by using one or more Powel lenses, or other beam shaping lenses, diffractive or scattering components). For example, in some implementations light emitted by light sources 511 and 512 can be sent through an optical diffraction grating to generate an optical diffraction grating pattern (SIM pattern) that can be projected onto a sample.

LGC 510 may further include mirror 514 and semi-reflective mirror 515 configured to direct the light beams through a single interface port to an emission optics module (EOM) 530. The light beams may pass through a shutter element 516. EOM 530 may include objective 535 and a z-stage 536 which moves objective 535 longitudinally closer to or further away from a target 550. For example, target (e.g., a patterned flowcell) 550 may include a liquid layer 552 and a translucent cover plate 551, and a biological sample may be located at an inside surface of the translucent cover plate as well an inside surface of the substrate layer located below the liquid layer. The z-stage may then move the objective as to focus the light beams onto either inside surface of the flowcell (e.g., focused on the biological sample). The biological sample may be DNA, RNA, proteins, or other biological materials responsive to optical sequencing as known in the art.

EOM 530 may include semi-reflective mirror 533 to reflect a focus tracking light beam emitted from a focus tracking module (FTM) 540 onto target 550, and then to reflect light returned from target 550 back into FTM 540. FTM 540 may include a focus tracking optical sensor to detect characteristics of the returned focus tracking light beam and generate a feedback signal to optimize focus of objective 535 on target 550.

EOM 530 may also include semi-reflective mirror 534 to direct light through objective 535, while allowing light returned from target 550 to pass through. In some implementations, EOM 530 may include a tube lens 532. Light transmitted through tube lens 532 may pass through filter element 531 and into camera assembly 520. Camera assembly 520 may include one or more optical sensors 521, e.g., TDI line scanning sensors, to detect light emitted from the biological sample in response to the incident light beams (e.g., fluorescence in response to red and green light received from light sources 511 and 512). In one example, an LGC (such as that described above) may project light through a diffraction grating to generate a linear fringe pattern.

Output data from the sensors of camera assembly 520 may be communicated to a real time analysis circuit 525. Real time analysis circuit 525, in various implementations, executes computer readable instructions for analyzing the image data (e.g., image quality scoring, base calling, etc.), reporting or displaying the characteristics of the beam (e.g., focus, shape, intensity, power, brightness, position) to a graphical user interface (GUI), etc. These operations may be performed in real-time during imaging cycles to minimize downstream analysis time and provide real time feedback and troubleshooting during an imaging run. In implementations, real time analysis circuit 525 may be a computing device (e.g., computing device 1100) that is communicatively coupled to and controls imaging system 500. In implementations further described below, real time analysis circuit 525 may additionally execute computer readable instructions for correcting distortion in the output image data received from camera assembly 520.

FIGS. 6A-6C represent an example representation of TDI line scanning of an asymmetrically patterned flowcell, where SIM is used to increase resolution along one axis of the flowcell. In particular, FIG. 6A illustrates an asymmetrically patterned flowcell 620 (which may be an implementation of asymmetrically patterned flowcell 320 (FIG. 3C) on which a SIM pattern 630 is overlaid. TDI line scanning can be performed along the y axis, to capture row-by-row images of the asymmetrically patterned flowcell 620. The images captured in FIG. 6A are captured with SIM pattern 630 in a first phase.

By way of example, line scanning imaging system 500 may use LGC 510 in coordination with the optics of the system to line scan the sample (overlaid with a SIM pattern, i.e., an optical diffraction grating pattern) with light having wavelengths within the red color spectrum and to line scan the sample with light having wavelengths within the green color spectrum. In response to line scanning, fluorescent dyes situated at the different spots of the sample may fluoresce and the resultant light may be collected by the objective lens 535 and directed to an image sensor of camera assembly 520 to detect the florescence. For example, fluorescence of each spot may be detected by a few pixels of camera assembly 520. Image data output from camera assembly 520 may then be communicated to real time analysis circuit 525 for processing, e.g., to combine the images to form a swath.

FIG. 6B illustrates asymmetrically patterned flowcell 620 overlaid with SIM pattern 630. However, in FIG. 6B, SIM pattern 630 has been phase shifted along the x axis (in alignment with the axis needing a resolution increase to resolve the sample). As described above, line scanning imaging system 500 may use LGC 510 in coordination with the optics of the system to line scan the sample (overlaid with phase shifted SIM pattern 630). Images may be captured and output from camera assembly 520 and again communicated to real time analysis circuit 525 for processing.

FIG. 6C illustrates asymmetrically patterned flowcell 620 overlaid with SIM pattern 630. In FIG. 6C, SIM pattern 630 has been phase shifted to a third phase along the x axis (in alignment with the axis needing a resolution increase to resolve the sample). Again, line scanning imaging system 500 may use LGC 510 in coordination with the optics of the system to line scan the sample (overlaid with phase shifted SIM pattern 630). Images may be captured and output from camera assembly 520 and again communicated to real time analysis circuit 525 for processing. The images captured in accordance with each phase/phase shift may be combined by real time analysis circuit 525 into a single image and retransformed into real space to generate an image having a higher resolution, in this example, along the x axis.

Figure 6D:
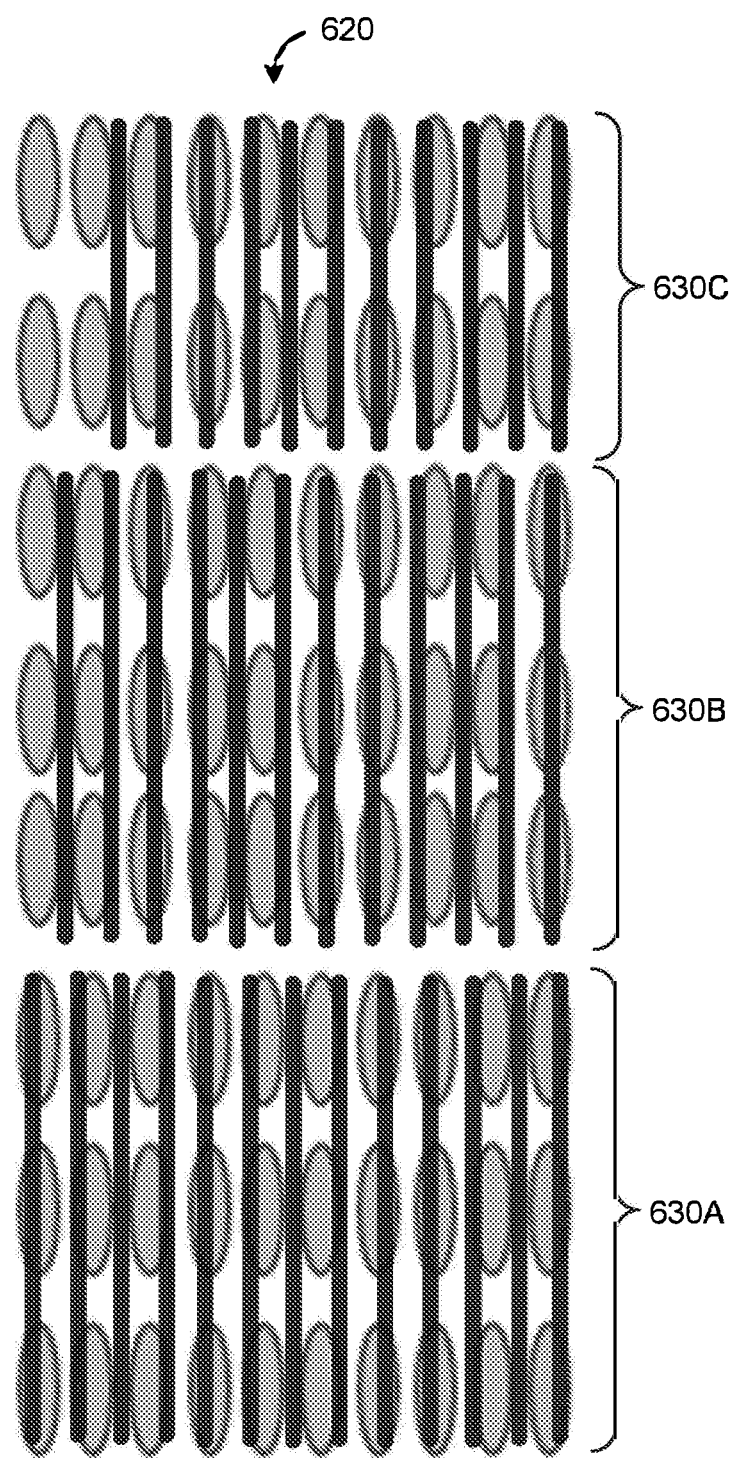
FIG. 6D illustrates one example of an asymmetrically patterned flowcell having different portions simultaneously overlaid with phase shifted structured illumination patterns

In another implementation, as illustrated in FIG. 6D, different portions of flowcell 620 can be overlaid with SIM pattern 630 in its different phases. That is, a SIM pattern in a first phase 630A is overlaid along a lower portion of flowcell 620, the same SIM pattern in a second phase 630B is overlaid along a middle portion of flowcell 620, and again, the same SIM pattern in a third phase 630C is overlaid along an upper portion of flowcell 620. Accordingly line scanning imaging system 500 line scans flowcell 620 overlaid with the different phases of a SIM pattern, (630A-630B), such that line scanning imaging system 500 can image the entire flow, in accordance with each requisite phase of the SIM pattern, in a single run. In some implementations, line scanning imaging system 500 can be modified to have multiple LGCs and multiple cameras or sensors/camera assemblies, e.g., three, each of which generate and output light through three optical diffraction gratings (the same but oriented in different phases) to generate the three phases of the SIM pattern. In this way, each camera or sensor/camera assembly is able to capture an image of flowcell 620 along with a different SIM pattern phase simultaneously.

As alluded to above, in still other implementations, a sample/flowcell can be moved while the SIM pattern remains stationary. When implementing TDI line scanning, the sample/flowcell is already moving. Hence, this movement of the sample/flowcell can be leveraged to avoid having to shift the SIM pattern. That is, the movement of the sample/flowcell relative to the stationary SIM pattern generates the requisite phases needed to resolve the sample.

Figure 7:
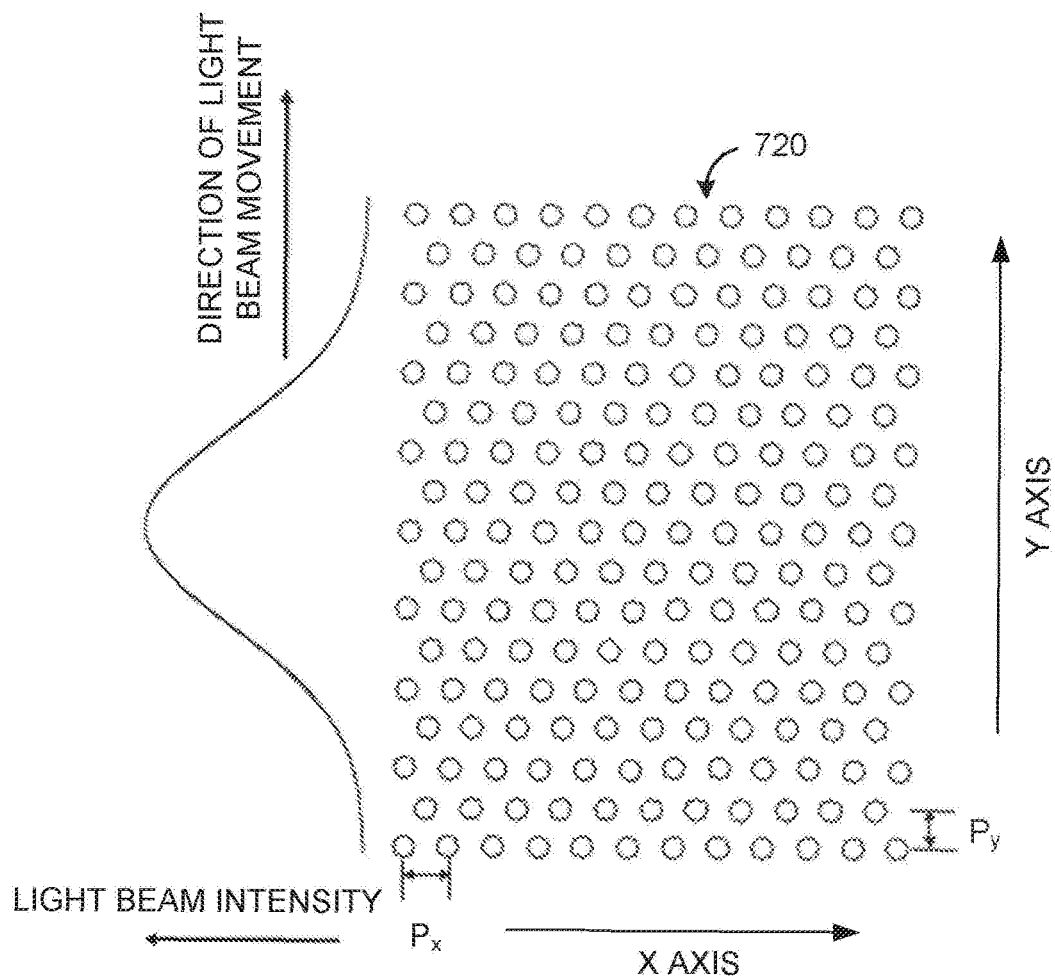
FIG. 7 illustrates an example of a line scanning operation using a conventionally patterned flowcell.

FIG. 7 illustrates another example patterned flowcell 720, similar to the hexagonal array patterned flowcell 300 (FIG. 3A). In a conventional structured illumination imaging system, flowcell 720 can be line scanned, e.g., in the direction of the y axis. Intensity of a light beam output by an LGC, e.g., LGC 510 (FIG. 5) onto the sample in flowcell 720 is shown as being wide and homogenous along the x axis (not shown, but substantially or exactly perpendicular to the line scanning direction). Along the y axis, however, the intensity of the light beam is narrow. As the laser beam moves relative to flowcell 720, fluorescence images are captured by a line scanning camera or sensor, e.g., camera assembly 520 (FIG. 5) in the corresponding area being illuminated by the light beam.

However, taking advantage of the fact that the sample/flowcell 720 is already moving, and because only one dimensional SIM is needed to resolve samples in an asymmetrically patterned flowcell, e.g., flowcell 320 (FIG. 3C), the optical diffraction grating that produces the SIM pattern can be kept still. That is, the requisite multiple (e.g., three) phases needed to adequately resolve the sample. Accordingly, moving stages or other elements needed for moving, e.g., a rotating or translating the optical diffraction grating, in a conventional line scanning imaging system are not needed in this implementation.

Figure 8:
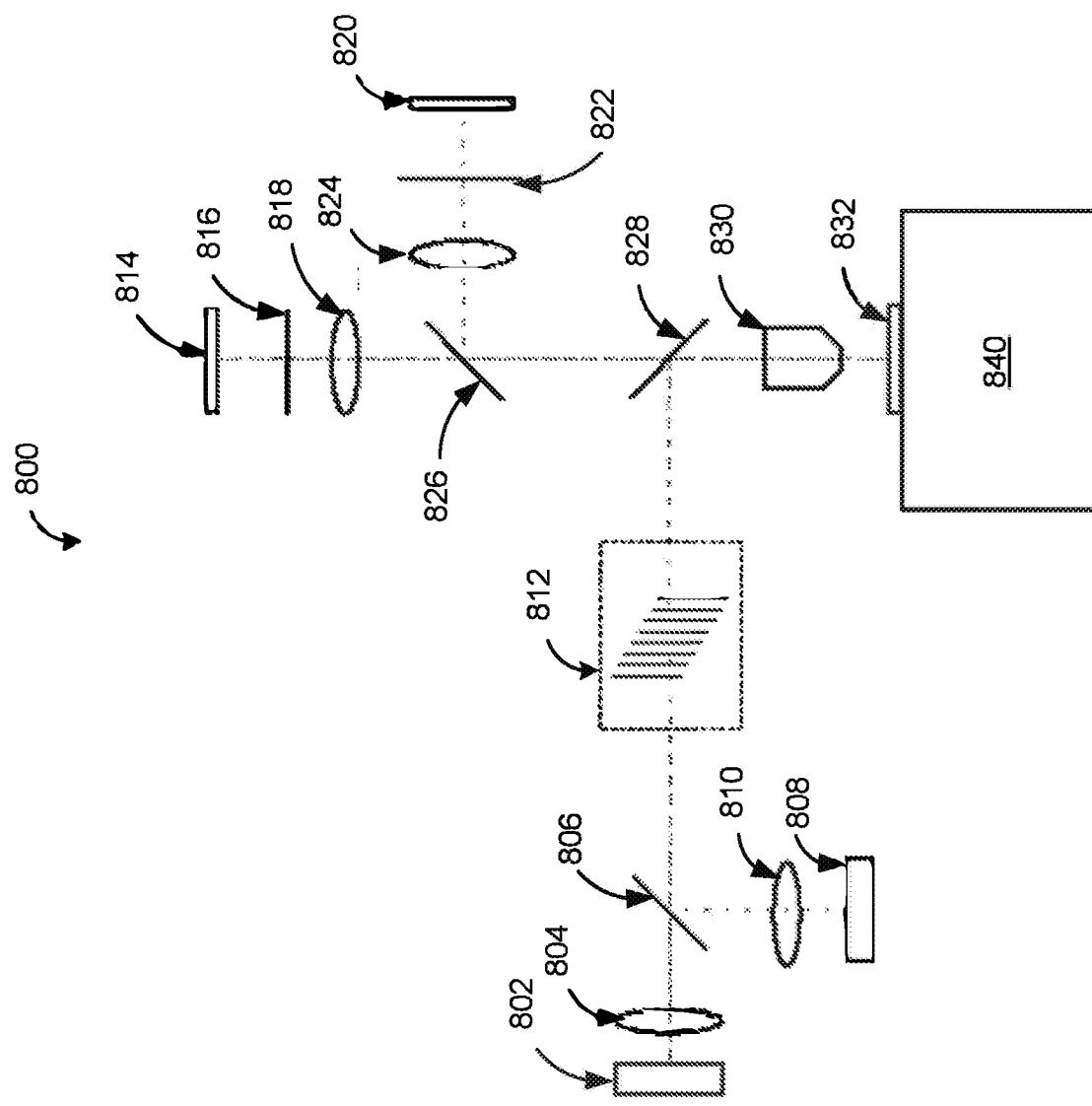
FIG. 8 illustrates an example of a line scanning imaging system using a stationary structured illumination pattern.

FIG. 8 illustrates an example line scanning imaging system 800 that uses a stationary optical diffraction grating. It should be noted that, for ease of explanation, FIG. 8 is a simplified illustration in which not all features/elements are shown. However, line scanning system 800 may be one implementation of line scanning imaging system 500 that uses a stationary optical diffraction grating to keep the resulting optical diffraction grating pattern/SIM pattern still.

In the example of FIG. 8, a light emitter, e.g., laser 802, is configured to output a light beam that is collimated by collimation lens 804. In one implementation, laser 802 emits light in the green wavelength. The collimated light is directed by dichroic filter 806 through a stationary optical diffraction grating 812 to objective lens 830 via another dichroic filter 828 onto a sample of a sample container 832. In this implementation, sample container 830 is an asymmetrically patterned flow cell, such as flowcell 320 (FIG. 3C).

A second light emitter, e.g., laser 808, emits light (in the red wavelength, for example) through stationary optical diffraction grating 812 to objective lens 830, also via dichroic filter 828, and onto the sample of sample container 832. Sample container 832 is positioned on a stage 840 that can move sample container 832 relative to the light beams from lasers 802 and 808. In the case of a fluorescent sample, the sample fluoresces in response to the structured excitation light (laser beams from lasers 802 and 808), and the resultant light is collected by objective lens 828 and directed to an image sensor of cameras 814 and 820.

Dichroic filter 806 is used to pass the green light beam from laser 802 to pass on through to stationary optical diffraction grating 812, while reflecting the red light beam from laser 808 towards stationary optical diffraction grating 812. Dichroic filter 828 functions similarly in that it allows the red and green light beams from lasers 802 and 808 to be reflected to objective lens 830, while allowing camera 814 and 820 to respectively capture images fluoresced with the green and red light. Dichroic filter 816 directs green light emissions from the fluoresced sample to camera 814, while dichroic filter 822 directs red light emissions from the fluoresced sample to camera 820. Lenses 818 and 824 are collimating lens for cameras 814 and 820, respectively. Dichroic mirror 826 directs the green and red light emissions from the fluoresced sample to the appropriate cameras.

In line scanning system 800, optical diffraction grating 812 is stationary. That is, as previously discussed, by using asymmetrically patterned flowcells in conjunction with SIM, only one dimension of structured illumination is needed, and multiple phases can be achieved by moving the beam along the flowcell. In other words, movement of the laser beam relative to the sample/flowcell or movement of the sample/flowcell relative to the laser beam, resulting in the relative movement between sample and fringe excitation patterns is all that is needed to generate the different phases.

Figure 9:
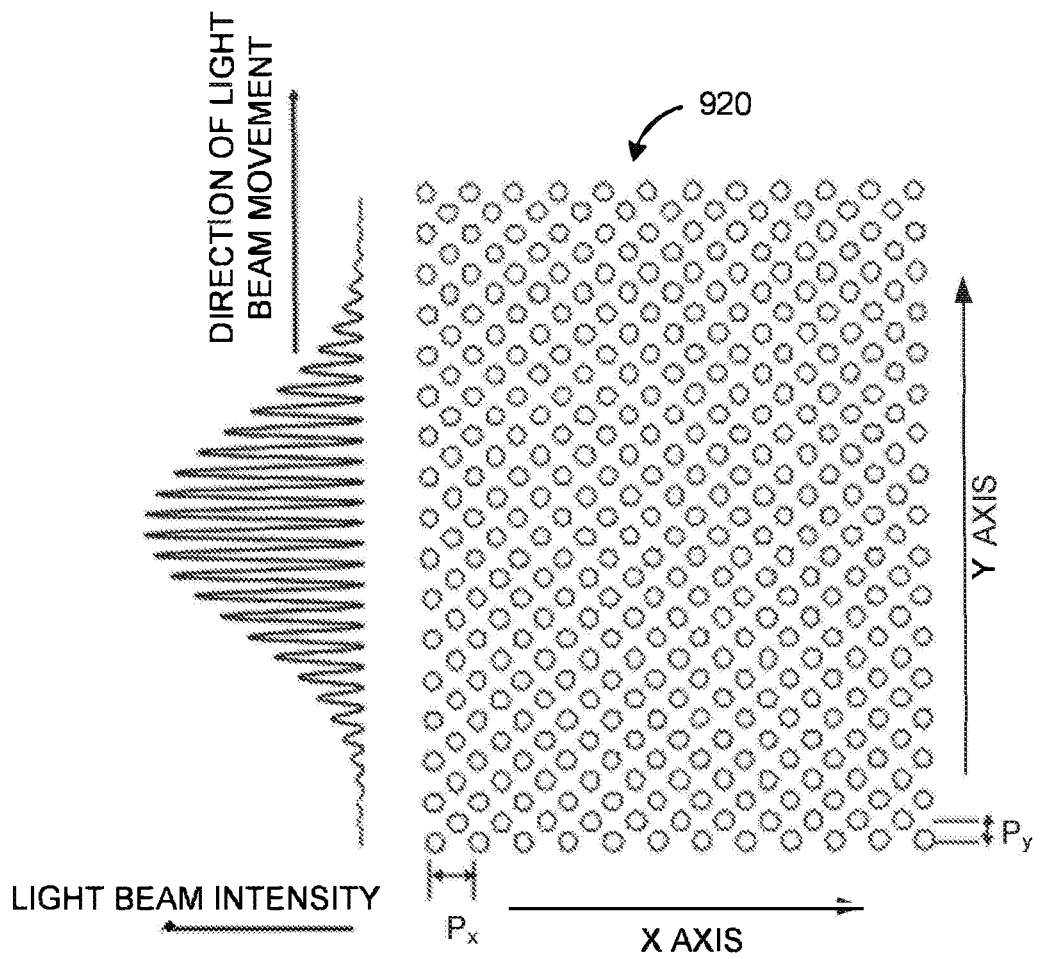
FIG. 9 illustrates an example of a line scanning operation using a stationary structured illumination pattern that modulates an illumination light beam.

FIG. 9 illustrates a patterned flowcell 920 that may be line scanned with a line scanning imaging system, such as line scanning system 800. An optical diffraction grating pattern can be projected onto flowcell 920, while flowcell 920 moves in accordance with line scanning imaging techniques. Movement of flowcell 920 relative to the stationary optical diffraction grating pattern creates the necessary phase shifts and the images captured during line scanning, once combined and retransformed into real space increase the resolution, as previously discussed.

In particular, the light beam moves in the direction of the y axis. Again, intensity of the light beam is homogenous along the x axis (not shown), but the intensity along the y axis is modulated due to passage through a stationary optical diffraction grating, e.g., stationary optical diffraction grating 812 (FIG. 8). As the light beam moves relative to flowcell 920, the optical diffraction grating pattern shifts. In fact, more than three, or even dozens of phase shifts can be generated. As a result, by moving the sample/flowcell 920 instead of the optical diffraction grating, an increase in resolution along the axis of the line scanning can be achieved. In some implementations, as described above, resolution in this direction can be increased by at least two times on surfaces with either both random features or periodic patterns. It should be understood that because the resolution can be increased, e.g., by at least two times, the density of the nanowells in flowcell 920 can be increased by a factor of two or more.

Figure 10:
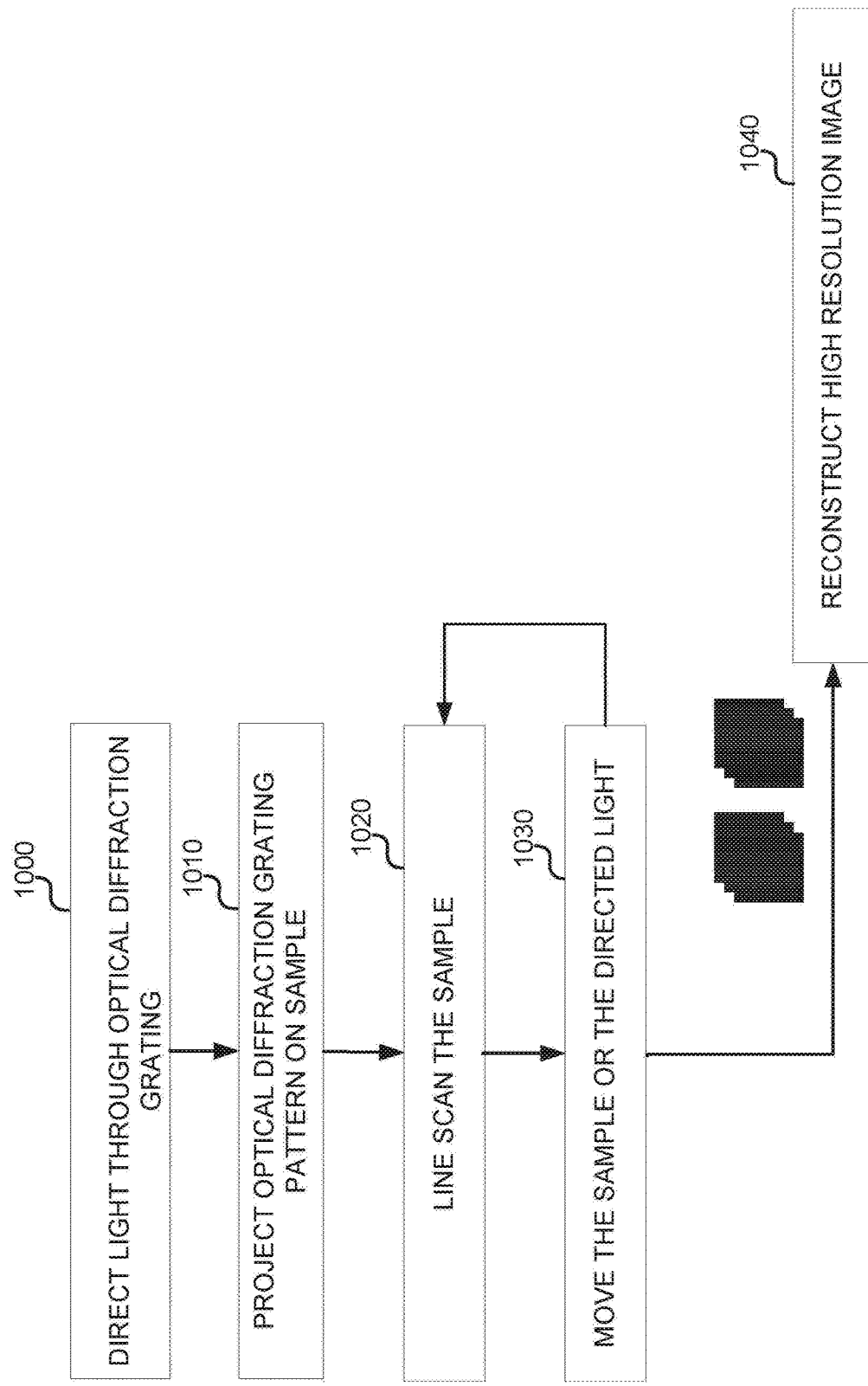
FIG. 10 is a flow chart illustrating example operations that may be implemented for reduced dimensionality structured illumination imaging used in conjunction with line scanning imaging.

FIG. 10 is a flow chart illustrating example operations that can be performed in a line scanning imaging system, such as line scanning imaging system 500 (FIG. 5) or line scanning imaging system 800 (FIG. 8), to sequence a sample using an asymmetrically patterned flowcell. At operation 1000, light beams from laser sources, e.g., laser sources 802 and 808, are output through a stationary optical diffraction grating, e.g., stationary optical diffraction grating 812, corresponding to a first optical diffraction grating pattern orientation may be turned on. At operation 1010, the optical diffraction grating pattern is projected onto a sample, and at operation 1020, the sample is line scanned. Line scanning may be performed as previously described with regarding to line scanning imaging system 800 (FIG. 8). At operation 1030, the sample is moved in accordance the aforementioned line scanning techniques or the directed light may be moved as also described above to achieve relative motion between the sample and optical diffraction grating pattern.

Operations 1020 and 1030 may be repeated as many times as necessary to capture images representative of the entire sample. Again, as a result of the sample being moved relative to the stationary optical diffraction grating pattern, images of the sample and optical diffraction grating pattern can be captured across the requisite phase shifts needed to increase resolution. At operation 1040, a high resolution image can be reconstructed.

It should be noted that in order to prevent motion blur between the optical diffraction grating pattern and the sample during line scanning, the laser sources can operate in a pulsed fashion. That is, the laser sources, e.g., laser sources 802 and 808 may be pulsed so that at every excitation, a line scanning image can be captured. In some implementations, the orientation of the optical diffraction grating pattern relative to the sample/flowcell can be shifted by 90°. In other implementations, as illustrated in FIGS. 6A-6C, if the orientation of the optical diffraction grating pattern is such that the sample is not moving through areas of light and dark (as may be the case if the orientation of the optical diffraction grating pattern was shifted by 90°), pulsing of the laser sources may not be needed because movement of the sample relative to the optical diffraction grating pattern moves through the same fringe intensity.

It should be noted that, although implementations described herein have been primarily described in the context of using diffraction gratings to create fringe patterns that are projected onto an imaged sample, in implementations the projected fringe patterns need not necessarily be created by diffraction gratings. Any method of creating a sinusoidal fringe pattern may be suitable. Creation of a fringe pattern may be achieved via interference between two counter propagating beams, mutually coherent at the point of the desired interference pattern; via coherent or incoherent imaging of a diffraction grating; via beams separated via a beam splitter and interfered; counter propagating beams in a light-pipe or waveguide, etc.

Figure 11:
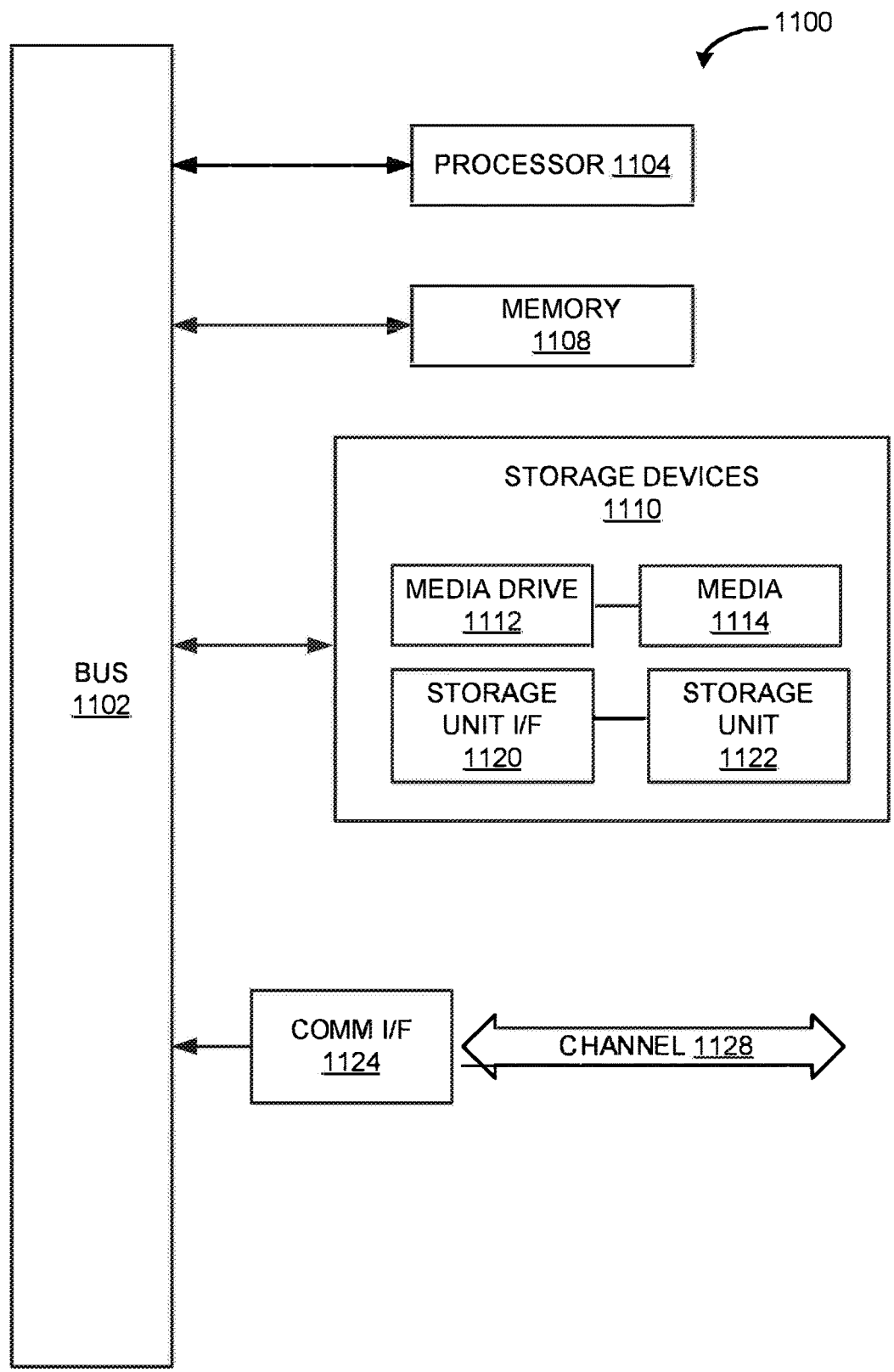
FIG. 11 illustrates an example computing component that may be used to implement various features of implementations described in the present disclosure.

FIG. 11 illustrates an example computing component that may be used to implement various features of the system and methods disclosed herein, such as the aforementioned features and functionality of one or more aspects of the methods illustrated in FIGS. 4 and 10 implemented in systems 200, 500, and/or 800 and described herein. For example, computing component may be implemented as a real-time analysis circuit 525.

As used herein, the term circuit might describe a given unit of functionality that can be performed in accordance with one or more implementations of the present application. As used herein, a circuit might be implemented utilizing any form of hardware or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, one of ordinary skill in the art after reading this description, can appreciate that the various features and functionality described herein may be implemented in any given application and can be implemented in one or more separate or shared circuits in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or circuits of the application are implemented in whole or in part using software, in one implementation, these software elements can be implemented to operate with a computing or processing module capable of carrying out the functionality described with respect thereto. One such example computing component is shown in FIG. 13. Various implementations are described in terms of this example-computing component 1000. After reading this description, it will become apparent to a person skilled in the relevant art how to implement the application using other computing modules or architectures.

Referring now to FIG. 13, computing component 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing component 1000 or to communicate externally.

Computing component 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical disk drive, a CD or DVD drive (R or RW), or other removable or fixed media drive might be provided. Accordingly, storage media 1014 might include, for example, a hard disk, a solid state drive, magnetic tape, cartridge, optical disk, a CD, DVD, or Blu-ray, or other fixed or removable medium that is read by, written to or accessed by media drive 1012. As these examples illustrate, the storage media 1014 can include a computer usable storage medium having stored therein computer software or data.

In alternative examples, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1008, storage unit 1022, and media 1014. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

Although described above in terms of various examples and implementations, it should be understood that the various features, aspects and functionality described in one or more of the individual implementations are not limited in their applicability to the particular implementation with which they are described, but instead can be applied, alone or in various combinations, to one or more of the other implementations of the application, whether or not such implementations are described and whether or not such features are presented as being a part of a described implementation. Thus, the breadth and scope of the present application should not be limited by any of the above-described example implementations.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide example instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that may be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various implementations set forth herein are described in terms of example block diagrams, flow charts and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

While various implementations of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent component names other than those depicted herein can be applied to the various partitions. Additionally, with regard to flow diagrams, operational descriptions and method claims, the order in which the steps are presented herein shall not mandate that various implementations be implemented to perform the recited functionality in the same order unless the context dictates otherwise.

What is claimed is:

1. A method of imaging a biological sample, comprising:
   projecting an optical pattern onto a biological sample and capturing a first image of the optical pattern overlaid on the biological sample, the biological sample being contained in an asymmetrically patterned flowcell comprising a plurality of elongated nanowells, wherein each of the elongated nanowells is elliptically shaped or rectangularly shaped;
   phase shifting the projected optical pattern relative to the biological sample and capturing at least a second image of the phase shifted optical pattern overlaid on the biological sample; and
   reconstructing a high resolution image representative of the biological sample based upon the first captured image and the at least second captured image.

2. The method of claim 1, wherein each of the plurality of elongated nanowells are oriented such that along a first axis of the asymmetrically patterned flowcell, resolution is increased to resolve information representative of the biological sample.

3. The method of claim 2, wherein each of the plurality of elongated nanowells are oriented such that along a second axis of the asymmetrically patterned flowcell, resolution is not increased to resolve information representative of the biological sample.

4. The method of claim 1, wherein the capturing of the first and the at least second images comprises performing line scanning imaging.

5. The method of claim 4, further comprising: directing light through an optical diffraction grating in a first phase and angle orientation, wherein the optical pattern projected onto the biological sample is an optical diffraction grating pattern generated by the light being directed through the optical diffraction grating, wherein phase shifting the projected optical pattern relative to the biological sample comprises phase shifting the optical diffraction grating.

6. The method of claim 5, wherein the phase shifting of the optical diffraction grating comprises phase shifting the optical diffraction grating along the first angle orientation.

7. The method of claim 6, wherein the phase shifting of the optical diffraction grating occurs perpendicularly to a direction of the line scanning imaging.

8. The method of claim 1, further comprising:
   directing light through an optical diffraction grating in a first phase and angle orientation, wherein the optical pattern projected onto the biological sample is an optical diffraction grating pattern generated by the light being directed through the optical diffraction grating, wherein phase shifting the projected optical pattern relative to the biological sample comprises phase shifting the optical diffraction grating; and
   performing a third phase shift of the optical diffraction grating, projecting the optical diffraction grating pattern onto the biological sample and capturing at least a third image of the phase shifted optical diffraction grating pattern overlaid on the biological sample prior to reconstructing the high resolution image.

9. A method of imaging a biological sample, comprising:
   directing light through an optical diffraction grating in a first phase and angle orientation;
   projecting an optical diffraction grating pattern generated by the light being directed through the optical diffraction grating onto the biological sample and capturing a first image of the optical diffraction grating pattern overlaid on the biological sample, the biological sample being contained in an asymmetrically patterned flowcell comprising a plurality of elongated nanowells, wherein each of the elongated nanowells is elliptically shaped or rectangularly shaped;
   phase shifting the optical diffraction grating, projecting the optical diffraction grating pattern onto the biological sample and capturing at least a second image of the phase shifted optical diffraction grating pattern overlaid on the biological sample;
   reorienting the optical diffraction grating to a second angle orientation, projecting the optical diffraction grating pattern onto the biological sample, and capturing a third image of the optical diffraction grating pattern overlaid on the biological sample;
   phase shifting the optical diffraction grating, projecting the optical diffraction grating pattern onto the biological sample and capturing at least a fourth image of the phase shifted optical diffraction grating pattern overlaid on the biological sample; and
   reconstructing a high resolution image representative of the biological sample based upon the first, the at least second, the third, and the at least fourth captured images.

10. A system, comprising:
    a laser source emitting a light beam;
    an optical diffraction grating adapted to generate an optical diffraction grating pattern upon passage of the emitted light beam through the optical diffraction grating;
    a camera assembly adapted to capture a plurality of images of optical diffraction grating pattern overlaid on a biological sample, the plurality of images reflecting three phases of the optical diffraction grating relative to the biological sample, wherein the biological sample is located in a flowcell comprising a plurality of nanowells that are oriented in an asymmetrical array and wherein each of the plurality of nanowells are elliptically shaped or rectangularly shaped; and a processor adapted to reconstruct a high resolution image representative of the biological sample based on a combination of the plurality of images.

11. The system of claim 10, wherein each of the plurality of nanowells are oriented such that along a first axis of the flowcell, resolution is increased to resolve information representative of the biological sample.

12. The system of claim 11, wherein each of the plurality of nanowells are oriented such that along a second axis of the flowcell, resolution is not increased to resolve information representative of the biological sample.

13. A system, comprising:
a laser source emitting a light beam;
an optical diffraction grating adapted to generate an optical diffraction grating pattern upon passage of the emitted light beam through the optical diffraction grating;
a camera assembly adapted to capture a plurality of images of optical diffraction grating pattern overlaid on a biological sample, the plurality of images reflecting three phases of the optical diffraction grating relative to the biological sample, wherein the camera assembly comprises a time delay integration line scanning camera assembly; and
a processor adapted to reconstruct a high resolution image representative of the biological sample based on a combination of the plurality of images.

14. The system of claim 13, wherein the biological sample is contained in a flowcell, different portions of which are overlaid with representations of the three phases of the optical diffraction grating simultaneously.

15. The system of claim 13, wherein the optical diffraction grating comprises three phase stepped elements, wherein each of the three phase stepped elements is adapted to generate an optical diffraction grating pattern upon passage of the emitted light beam through the phase stepped element, wherein the camera assembly is adapted to capture an image of an optical diffraction grating pattern generated by each of the three phase stepped elements overlaid on the biological sample.

16. The system of claim 15, wherein the camera assembly comprises three image sensors, each of the three image sensors adapted to capture the image of the optical diffraction grating pattern generated by a respective one of the phase stepped elements.

17. A system, comprising:
a laser source emitting a light beam;
an optical diffraction grating adapted to generate an optical diffraction grating pattern upon passage of the emitted light beam through the optical diffraction grating;
a camera assembly adapted to capture a plurality of images of optical diffraction grating pattern overlaid on a biological sample, the plurality of images reflecting three phases of the optical diffraction grating relative to the biological sample and two angular orientations of the optical diffraction grating relative to the biological sample, wherein the biological sample is located in a flowcell comprising a plurality of nanowells that are oriented in an asymmetrical array and wherein each of the plurality of nanowells are elliptically shaped or rectangularly shaped; and
a processor adapted to reconstruct a high resolution image representative of the biological sample based on a combination of the plurality of images.

18. The system of claim 17, wherein each of the plurality of nanowells are oriented such that resolution is increased to resolve information representative of the biological sample along first and second axes of the flowcell.

* * * * *